(12) United States Patent
Webb et al.

(10) Patent No.: US 8,861,947 B2
(45) Date of Patent: Oct. 14, 2014

(54) METHOD AND SYSTEM FOR CORRECTING CAMERA POINTING ANGLE IN AN ACTIVELY STABILIZED SYSTEM TO COMPENSATE FOR TRANSLATIONAL MOVEMENTS

(71) Applicant: Freefly Systems, Inc., Redmond, WA (US)

(72) Inventors: Steve Webb, Gravesend (GB); John Ellison, Ipswich (GB); Tabb Firchau, Redmond, WA (US)

(73) Assignee: Freefly Systems, Inc., Redmond, WA (US)

( * ) Notice: Subject to any disclaimer, the term of this patent is extended or adjusted under 35 U.S.C. 154(b) by 0 days.

(21) Appl. No.: 14/214,536

(22) Filed: Mar. 14, 2014

(65) Prior Publication Data

US 2014/0270744 A1    Sep. 18, 2014

Related U.S. Application Data

(60) Provisional application No. 61/792,878, filed on Mar. 15, 2013.

(51) Int. Cl.
*G03B 17/00* (2006.01)
*G02B 27/64* (2006.01)

(52) U.S. Cl.
CPC .................................... *G02B 27/646* (2013.01)
USPC ............................................ 396/55; 396/421

(58) Field of Classification Search
USPC ............... 396/55, 421, 428; 348/208.7, 211.9
See application file for complete search history.

(56) References Cited

U.S. PATENT DOCUMENTS

| 5,179,421 | A | 1/1993 | Parker et al. |
| 5,967,458 | A | 10/1999 | Williams et al. |
| 6,611,662 | B1 * | 8/2003 | Grober ........................... 396/55 |
| 6,867,799 | B2 | 3/2005 | Broemmelsiek |
| 6,965,397 | B1 * | 11/2005 | Honey et al. ............... 348/208.2 |
| 8,351,772 | B2 * | 1/2013 | Wakamatsu ................... 396/55 |
| 2005/0206726 | A1 | 9/2005 | Yoshida et al. |
| 2010/0110192 | A1 | 5/2010 | Johnston et al. |
| 2011/0042459 | A1 | 2/2011 | Sullivan et al. |
| 2011/0206124 | A1 | 8/2011 | Morphet et al. |
| 2012/0120258 | A1 | 5/2012 | Boutell et al. |
| 2013/0162852 | A1 | 6/2013 | Boyle et al. |

FOREIGN PATENT DOCUMENTS

GB          2375385 A    11/2002

OTHER PUBLICATIONS

"International Search Report & Written Opinion for PCT Application No. PCT/EP2014/055218", Mailed Date: Jun. 10, 2014, Filed Date: Mar. 14, 2014.

* cited by examiner

*Primary Examiner* — W B Perkey
(74) *Attorney, Agent, or Firm* — Saliwanchik, Lloyd & Eisenschenk

(57) ABSTRACT

A active stabilization system and a method for correcting a pointing direction of a camera to compensate for translational movements of the camera are described. The system actively stabilizes a pointing direction of the camera in accordance with a commanded pointing angle. A distance from the camera to a filming target is determined and one or more translational measurements associated with a translational movement of the camera are derived. A correction update is calculated as a function of at least the distance and the one or more translational measurements. The commanded pointing angle of the camera is adjusted based on the correction update to retain the filming target within a field of view of the camera.

47 Claims, 15 Drawing Sheets

METHOD AND SYSTEM FOR CORRECTING CAMERA POINTING ANGLE IN AN ACTIVELY STABILIZED SYSTEM TO COMPENSATE FOR TRANSLATIONAL MOVEMENTS

CROSS-REFERENCE TO RELATED APPLICATION

This application claims the benefit of Provisional Patent Application No. 61/792,878, filed on Mar. 15, 2013, which is hereby incorporated by reference herein in its entirety.

FIELD OF THE TECHNOLOGY

The present disclosure relates to stabilization systems, and more particularly to an improved, lightweight, hand-held or vehicle-mounted camera stabilization system for use in photographic or video-related applications.

BACKGROUND

In many applications, it is desirable to stabilize a payload so that it is not affected by vibrations and unwanted movements. This is particularly important in film-production, where any unintentional shaking or movements introduced by, for example, a camera operator can result in footage that is uncomfortable to watch or framed incorrectly.

Passive stabilization mounts have been used to reduce shaking and smooth out movements by using mechanical systems such as springs, shock-absorbers and counterbalances. However, these systems can be large and cumbersome to operate, and typically require a great deal of experience to control effectively. Software-based digital stabilization, as well as optical stabilization exists, but they are typically restricted to correcting small movements.

One technology that is becoming increasingly prevalent is that of active stabilization. The currently available active stabilization systems use motors to counteract any movements detected by motion sensors. Optical gyroscopic sensors, which are sufficiently accurate to detect small vibrations, are typically used in such systems. However, the optical gyroscopic sensors tend to be large and very expensive.

Thus, it is desirable to provide a low-cost, lightweight stabilization system that can effectively remove unwanted movements, while also providing a level of control and flexibility to operators to easily and intuitively capture the footage they require.

SUMMARY

The described embodiments of the invention provide for a method for correcting automatically a pointing angle of an actively stabilized camera to compensate for translational movements of the camera using a combination of velocity, position, and/or distance measurements associated with the translational movements of the camera.

In one embodiment, the present disclosure provides a method of correcting a pointing direction of a camera, actively stabilized by an active stabilization system in accordance with a commanded pointing angle, to compensate for translational movements of the camera, the method comprising: determining a distance from the camera to a filming target; deriving one or more translational measurements associated with a translational movement of the camera; calculating a correction update as a function of at least the distance and the one or more translational measurements; and adjusting the commanded pointing angle of the camera using the correction update to retain the filming target within a field of view of the camera.

In some example embodiments, the method further comprises stabilizing the pointing direction of camera based on the adjusted commanded pointing angle.

In some example embodiments, the determining a distance step comprises one or more of: obtaining the distance, wherein the distance has been pre-set by a camera operator; estimating the distance based on focus settings of the camera; estimating the distance based on global positioning system (GPS) locations of the camera and the filming target; and using a first range sensor co-located with the camera to measure the distance.

In some example embodiments, the first range sensor is one of: an ultrasonic sensor, a laser sensor, and an infrared sensor.

In some example embodiments, the one or more translational measurements comprise one or more of: a translational velocity of the camera and a vertical height derived in association with the translational movement of the camera.

In some example embodiments, the method of correcting a pointing direction of a camera is performed in association with a tilt axis and/or a pan axis.

In some example embodiments, if the translational movement is vertical, a tilt of the commanded pointing angle is adjusted at the adjusting step and/or, if the translational movement is horizontal, a pan of the commanded pointing angle is adjusted at the adjusting step.

In some example embodiments, the calculating a correction update step comprises: calculating a correction update as a function of at least the distance, the one or more measurements, and a current pointing angle of the camera.

In some example embodiments, the function for calculating the correction update rate provides correction updates of lower values for the camera having a higher elevation in relation to the filming target than for the camera having a lower elevation in relation to the filming target for translational movements of a same magnitude.

In some example embodiments, the correction update is an angular rate.

In some example embodiments, the correction update is an incremental angle update.

In some example embodiments, the method of correcting a pointing direction further comprises: setting the correction update to zero if the determined correction update is below a pre-set threshold.

In some example embodiments, the commanded pointing angle is adjusted incrementally, using an incremental correction update determined based on the correction update.

In some example embodiments, the distance, the one or more translational measurements, and/or the correction update are being updated with each incremental step.

In some example embodiments, the method of correcting a pointing direction further comprises: determining the incremental correction update based on the correction update and an update rate of an update cycle of the active stabilization system.

In some example embodiments, the adjusting step comprises adjusting the commanded pointing angle of the camera by the incremental correction update.

In some example embodiments the determining an incremental correction update step comprises: determining, based on the correction update and the update rate of the active stabilization system, a current incremental correction update for a current update cycle, and using the current incremental correction update and one or more prior incremental correction updates determined for one or more prior update cycles respectively to derive the incremental correction update.

In some example embodiments, the one or more translational measurements comprise a vertical height of the camera in relation to the filming target.

In some example embodiments, the calculating a correction update step comprises: calculating, based on the distance and the vertical height, a desired pointing angle for retaining the filming target within the field of view of the camera, and calculating the correction update based on the desired pointing angle and a current pointing angle of the camera.

In some example embodiments, the deriving one or more translational measurements step comprises: measuring a vertical distance of the camera to a reference point in association with the translational movement, and applying an offset correction value to the measured vertical distance to calculate the height measurement.

In some example embodiments, the offset correction value is updated when an operator's setting for the commanded pointing angle is changed.

In some example embodiments, the vertical distance is measured using a second range sensor collocated with the camera.

In some example embodiments, the second range sensor is one of: an ultrasonic sensor, a laser sensor, an optical sensor, and an infrared sensor.

In some example embodiments, a system is provided, the system comprising one or more processors, and memory comprising instructions which when executed by the one or more processors causes the system to carry out any of the methods described above.

In some example embodiments, a non-transitory computer-readable medium is provided, the medium storing program instructions for causing a processor to perform any of the methods described above.

In another embodiment, the present disclosure provides an active stabilization system for correcting a pointing direction of a camera to compensate for a translational movement of the camera, the system comprising: an inertial measurement unit configured to derive one or more translational measurements associated with a translation movement of the camera; a distance detector configured to determine a distance between the camera and a filming target; an active stabilization controller configured to actively stabilize the pointing angle of the camera in accordance with a commanded pointing angle, and a translation compensator configured to execute any of the methods described above, using the distance determined by the distance detector and the one or more translational measurements derived by the inertial measurement unit.

In some example embodiments, the translation compensator is configured to execute any of the methods described above for a pan axis and/or a tilt axis.

In some example embodiments, the active stabilization system is further configured to activate the translation compensator, in response to a selection by a camera operator, for executing any of the methods described above for (1) a pan axis, (2) a tilt axis, and/or (3) a pan axis and a tilt axis in parallel.

BRIEF DESCRIPTION OF DRAWINGS

Examples of the present proposed approach will now be described in detail with reference to the accompanying drawings, in which.

DETAILED DESCRIPTION

Figure 1:
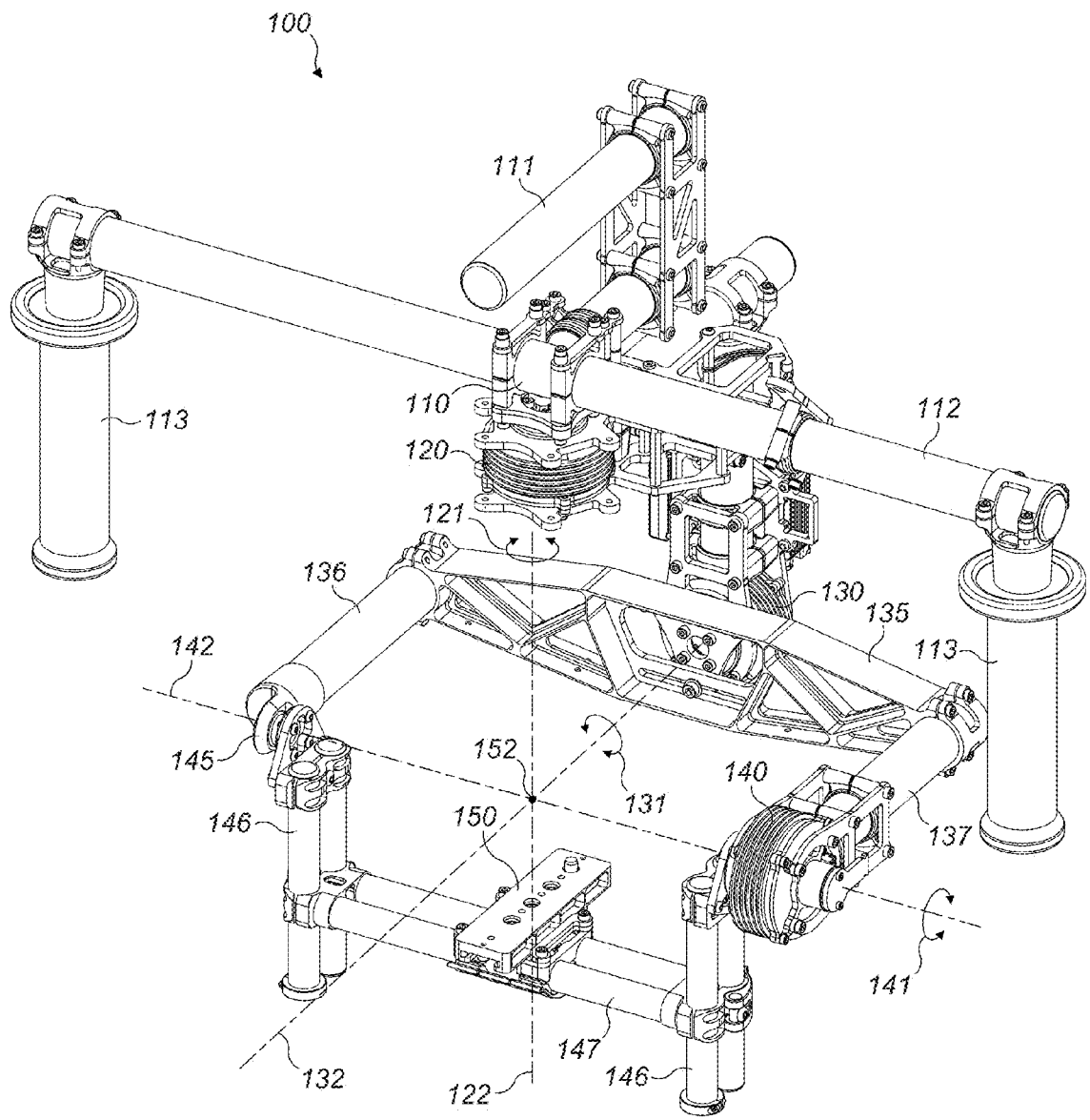
FIG. 1 shows a perspective view of a 3-axis stabilization system for carrying out stabilization techniques in accordance with the present disclosure, according to some embodiments.

FIG. 1 shows a 3-axis camera stabilization system 100, also referred to as a gimbal, according to some embodiments of the present invention. The system 100 includes a support base 110 to which a support frame 112 is attached for manual support and manipulation by an operator. Two handles 113 are attached to the support frame 112 on either side of the support base 110 to allow for two-handed operation of the gimbal 100 and full control over movement of the gimbal 100. A secondary frame 111 is attached to the support base 110 and may be used to attach the overall system 100 to a vehicle or other support or mount. The secondary frame 111 may also be used as a handle for single-handed operation by the operator. Further, peripheral devices may be attached to the secondary frame 111.

The illustrated system 100 is equipped with three motors, a pan axis motor 120, a tilt axis motor 140 and a roll axis motor 130. These motors can provide a rotational input in either direction around the pan 122, tilt 142, and roll 132 axes of the assembly as shown by arrows 121, 131, and 141, respectively. The three motors 120, 130, and 140, when working together, allow a full range of movement of a payload within the gimbal 100. In particular, the pan axis motor 120 is fixed (attached, or otherwise permanently secured, or is removable) to the support base 110 and configured (constructed, designed, or the like) to rotate a structure housing the roll axis motor 120. The roll axis motor 120 is in turn configured to rotate a structure housing the tilt axis motor 140, which is configured to rotate a payload (not shown).

In the illustrated system 100, the roll axis motor 130 rotates a roll beam 135, to which horizontal members 136 and 137 are attached. The tilt axis motor 140 is attached to one horizontal member 137, and its opposing pivot 145 is attached to the other horizontal member 136. The tilt axis motor 140 and the opposing pivot 145 rotate down-tubes 146 along with the cross member 147 attached to the down-tube 146, thereby rotating the payload attached to the cross member 147.

The payload will typically be a camera mounted to the system by a camera mounting arrangement 150. The camera mounting arrangement 150 is generally in the form of a plate, "shoe," or the like, which defines one or more protrusions for engaging with a corresponding recess on a mounting part of the camera. However, various coupling, engaging, and/or fixing means may be provided for securing the camera to the mounting arrangement 150, including but not limited to screw threads, clips, slide and lock mechanisms, and/or the like (not shown).

A point of intersection 152 of the three orthogonal axes 122, 132, and 142 preferably remains generally fixed regardless of the rotation of any of the three motors 120, 130, and 140. In order for a camera mounted in the stabilization system 100 to achieve "passive stability", the center of gravity (COG) of the camera, which varies for different camera designs, should be located at or as near as possible to point 152 where the three orthogonal axes 122, 132, and 142 intersect.

By positioning the camera COG at the intersection point 152, rotational moments applied to the camera by lateral acceleration disturbances of the system are reduced, or even eliminated. Furthermore, the inertia of the payload itself tends to cause the payload to maintain a pointing direction, notwithstanding frictional forces at the axes of rotation. By incorporating these or some other forms of passive stabilization into the arrangement of the system 100, the power draw of active stabilization is kept minimal, particularly when not in motion.

Adjustment means are provided within the stabilization system 100 in order to adjust the COG of a camera mounted to the mounting arrangement 150. For example, in FIG. 1, the mounting arrangement 150 is configured to enable repositioning of a mounted camera relative to each of the orthogonal axes. Centering the COG of the camera, mounted to the mounting arrangement 150, relative to an axis will render the camera "balanced" with respect to that axis. In other words, the camera COG will be at a neutral point relative to that axis, preferably located on the axis, or on a horizontal or vertical plane of the axis. Centering the COG of the camera along each of the orthogonal axes will provide for a balanced camera.

FIG. 1 depicts only an example of a gimbal structure suitable for performing the stabilization techniques described in the present disclosure. The support structures and actuators and their arrangement vary between different embodiments and may change depending on, for example, intended use of the gimbal assembly. For example, the support structures arrangement may be altered to prevent possible obstruction of the payload's view in certain direction(s), adapted to accommodate larger or smaller payloads, and the like.

Figure 2:
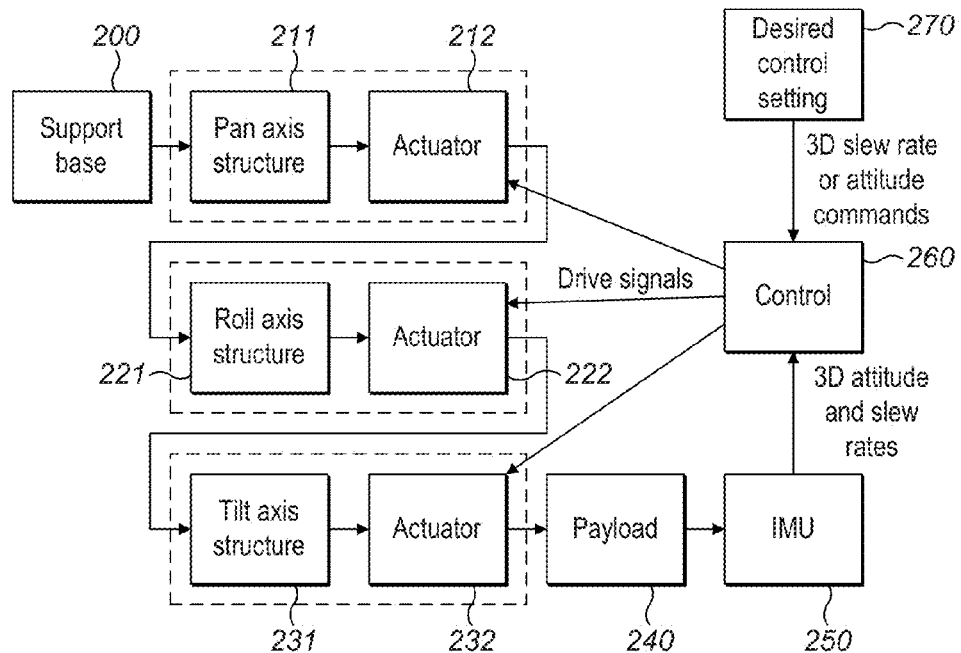
FIG. 2 is a flowchart showing the linkage of top-level elements of a 3-axis stabilization system, according to some embodiments.

FIG. 2 is a flow chart showing how the top level elements of a 3-axis gimbal structure are linked together, according to some embodiments. A support base 200 supports the rest of the gimbal structure and may be mounted to a vehicle, a fixed structure, or held by a camera operator. The support base 200 enables the entire gimbal structure to be moved to different locations during filming, while allowing the other components of the gimbal structure to rotate independently of the moving support base 200. Such an arrangement is particularly useful when camera is being moved while filming a scene.

In the exemplary embodiment of the gimbal structure of FIG. 2, the support base 200 is connected to a pan axis structure 211, which houses a pan axis actuator 212 for rotating the rest of the gimbal structure about a pan axis. Rotations about the pan axis ('panning') are rotations about a vertical axis and within a horizontal plane. In the systems disclosed herein, pan rotations are described relative to the gimbal structure.

The pan axis actuator 212 is connected to a roll axis structure 221 enabling pan rotations of the roll axis structure 221. The roll axis structure 221 houses a roll axis actuator 222 for rotating the rest of the gimbal structure about a roll axis. Rotations about the roll axis ('rolling') are rotations about an axis pointing forward relative to the gimbal structure, and are typically used for rotating the horizon.

The roll axis actuator 222 is connected to a tilt axis structure 231, enabling roll rotations of the tilt axis structure 231. The tilt axis structure 231 may house a tilt axis actuator 232 for rotating the rest of the gimbal structure about a tilt axis. Rotations about a tilt axis ('tilting') are rotations about an axis running horizontally across (left to right) of the gimbal structure, thus allowing rotations up and down relative to the gimbal structure.

The actuators 212, 222, and 232 and the supporting structures 211, 221, and 231 are connected in series to connect to a payload 240. Therefore, rotations by each of these actuators result in a corresponding rotation of the payload 240, thereby allowing full control of the payload's 240 rotations within the gimbal structure. The payload 240 is the object to be stabilized and typically is a camera.

The actuators 212, 222, and 232 are typically motors, but may be any other actuator capable of imparting rotational motion. The actuators could also be linear actuators coupled to cranks, or other mechanisms, for translating linear motion in to rotational motion. The range of rotations of the actuators within the system is preferably, but not necessarily, 360° about each respective axis. If restricted, the range of rotation may be restricted along some or all axes. Further, the range of motion may be limited by physical restrictions of the actuator and/or the surrounding support structure, for example.

The order in which the supporting structures and actuators are linked is not restricted to the order illustrated in FIG. 2 and may vary depending on, for example, an intended use or configuration of the gimbal. In FIG. 1, for example, the pan axis motor 120 is attached to the support base 110, thereby allowing the payload to pan a full 360° range, without the gimbal structure obstructing the view of the payload. However, tilting the payload substantially upward in this configuration may cause the structure to obstruct the view if the payload. Therefore, in the illustrated system 100, pan movements are prioritized over other tilt and roll movements. However, by linking the tilt axis motor to the support base before the pan axis motor instead allows a full range of unobstructed tilt motion.

Furthermore, the specific order of the actuator and axis structure may be rearranged to alleviate complications in wiring and connections. For example, if the support base 210 only comprises a handle, the pan axis actuator 212 could be mounted in the same structure 221 as the roll axis actuator 222, allowing for common wiring of the pan and roll axes actuators to be interlinked and be shorter.

An IMU (inertial measurement unit) 250 is attached to the payload 240 to monitor the motion and pointing direction of the payload 240. The IMU determines the angular position, also referred to herein as the attitude, of the payload. The attitude measurement consists of pitch (tilt), roll and yaw (pan) with respect to a reference frame, which is normally aligned to the Earth's surface. Alternatively, the attitude measurements may be made relative to the support base 200, or an arbitrary reference location and/or direction, for example on a filming set. The measurement of motion, or 'slew,' consists of measuring the rate of change of pitch, roll and yaw in the same axes. The present disclosure sometimes refers to these rates of change as a pitch (tilt) rate, a roll rate, and a yaw (pan) rate.

A control element (controller) 260 processes the attitude and motion measured by the IMU 250 to provide output drive signals in order to operate/actuate the actuators 212, 222, and 232 in closed loop feedback. The control element receives a target (desired) camera orientation from an external source 270. The external source 270 collects data concerning camera operator's intentions and either processes that data to derive the desired camera orientation, e.g., a pointing angle or slew rate, or provides the data to the control element 260 to derive the same. In a single-operator mode, the operator may indicate his or her intentions by manipulating the gimbal handles or using a thumb joystick or other controller on the gimbal. In a dual-operator mode, a remote operator may express his or her intentions using a remote controller that is in communication with the gimbal, e.g., via a radio link.

External disturbances on the pointing angle and/or required motion are compensated by the control loop applying correctional control signals to the actuators. These signals may be acceleration, braking, or reversal of motion by the actuators. The signals may represent a torque command such that a constant value would achieve a constant acceleration of the payload 240 acting against the physical moment of inertia. It is desirable, though not required, for the controller to achieve optimal control without overshoot or delay, while also giving the best speed response (highest control bandwidth). It is preferable for the actuators to be strong and the gimbal structure to be stiff to avoid resonances or flexure within the control bandwidth.

In some embodiments, the gimbal is simplified to fewer than 3 controllable axes. For example, a 2-axis gimbal may be used on a VTOL UAV (vertical take-off and landing unmanned aerial vehicle) as the 3rd pan axis would naturally be provided by the controlled rotation of the airframe.

Figure 3:
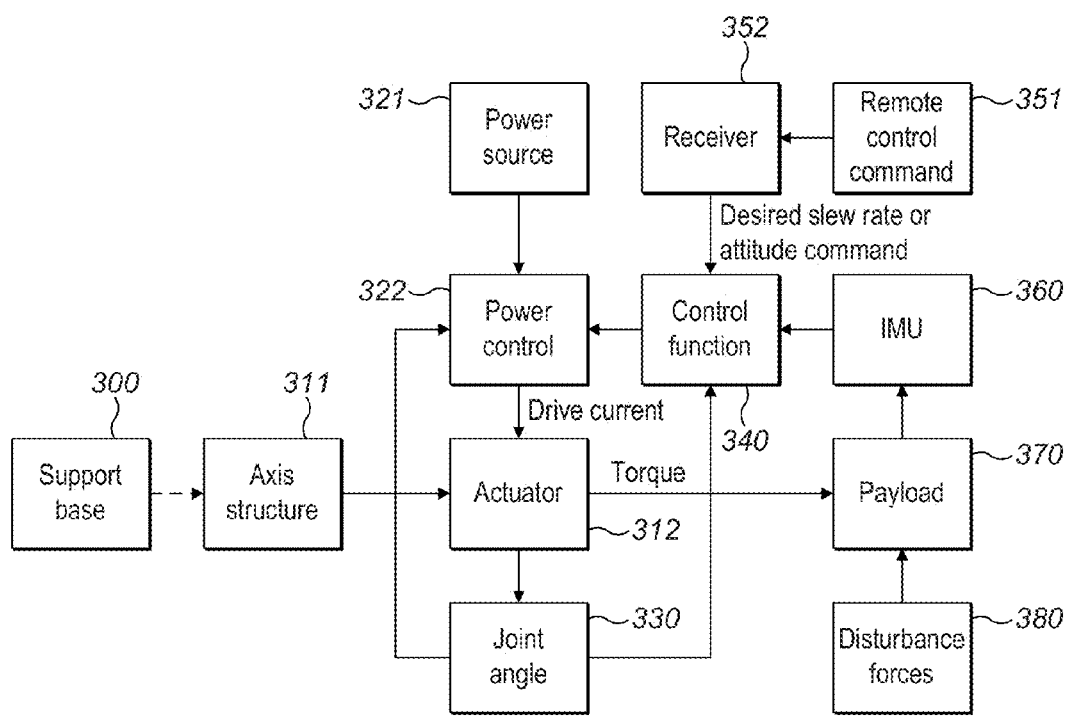
FIG. 3 is a flowchart showing the control elements for a single axis of a stabilization system, according to some embodiments.

FIG. 3 provides a detailed overview of a control system for a single axis. The motion with respect to the other axes in the gimbal is controlled by the same control system of FIG. 3 or a similar control system.

In FIG. 3, a support base 300 is connected either directly to the axis structure 311 or through intermediate elements, such as other axis structures. The axis structure 311 houses an actuator 312, which is coupled to a payload 370 to rotate it about an axis. The coupling of the actuator 312 to the payload 370 may be a direct coupling, such as a shaft, or via intermediate element(s) that are connected directly to the payload 370. The actuator 312 is capable of supplying a rotational torque to be applied to the payload 370 to cause an angular acceleration of the payload 370 dependent on its moment of inertia about the axis.

The control system of FIG. 3 further comprises an element 330 for measuring the joint angle between the actuator and its output shaft. By providing joint angle measurements, the element 330 allows the control system to determine the actual angle between the actuator and the payload to account for frictional torque forces, for example. What particular device(s) form the element 330 varies between different embodiments and includes, but is not limited to, resistive potentiometers, optical shutter wheel encoders, a magnetic Hall resolver, and/or a toothed wheel with a variable reluctance sensor.

In addition the torque forces applied to the payload 370 by the actuator 312, the payload 370 may also experience disturbance forces 380 about the same axis. Such disturbance forces may, for example, arise from friction of the actuator shaft when the support base 300 is rotated. If the payload 370 is not balanced about the axis, the disturbance forces 380 may also arise when the support base 300 is subject to lateral acceleration.

As shown in FIG. 3, the IMU 360 determines the attitude and motion of the payload 370 and outputs respective measurements to a control function 340. The combination of the payload mounted IMU 360 and control function 340 provides means for canceling any disturbance forces 380 and achieving a desired motion and/or constant set attitude with no unwanted disturbances.

In addition to the actual attitude and motion data of the payload 370, the control function 340 also receives a desired motion or pointing command, for example, supplied by a receiver 352, wirelessly communicating with a remote teleoperator via a remote control device 351. The remote operator may slew the gimbal and monitor feedback on a remote image monitor for a filming or sighting application. This allows a dual-operator mode in which one operator carries the gimbal for translational movement and the other operator, i.e., a remote operator, controls the pointing angle of the camera.

Alternatively, or in addition, both the desired motion and pointing command may be instigated by the operator carrying the gimbal using a handles based joystick or rotary knobs, such as a tilt thumbwheel control. In some embodiments, the control system of FIG. 3 uses the relative joint angle measurement 330 to command a slew by monitoring the support base motion. It is also possible for the slew and/or pointing commands to come from an artificial source such as a targeting computer, or a remote IMU that is mounted on another structure such as a monopod, tripod, a person, a vehicle, or the like.

The output of the control function 340 is amplified by a power control block which converts the current from a power source 321 (such as a rechargeable battery) into a form that is compatible with the actuator 312. The power control 322 is preferably regenerative and able to provide braking of the actuator 312 and to recover energy from a moving payload 370, thereby improving efficiency of the power control 322. For example, if a rotational motion is present in one direction and a reversal is required, then the actuator and the power control extract the rotational energy stored in the payload and replenish the power source. In some embodiments, the actuator 312 is accelerated and decelerated with equal capacity and is fully reversible.

Figure 4:
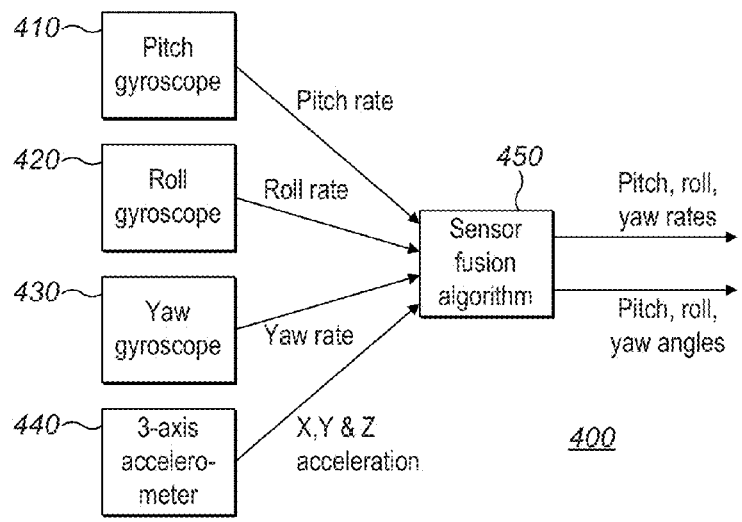
FIG. 4 is a flowchart showing the elements of a basic inertial measurement unit (IMU), according to some embodiments.

FIG. 4 illustrates elements of a basic IMU 400 for determining attitude and motion, according to some embodiments. The simple version of the basic IMU 400 provides only motion as an output, but no attitude measurements (data). Such a device includes gyroscopes 410, 420, and 430, whose outputs vary according to motion (slew) about their respective orthogonal axes, but no 3-axis accelerometer 440. For resolving the output of the gyroscopes at zero motion an algorithm is employed that averages over a long timescale and assumes short term disturbances, but substantially no movement, over the long timescale. This algorithm forms a high pass filter for subtracting the DC offset that would otherwise be observed at zero motion. The DC offset may change over time, for example, due to differences in the device temperature and ageing.

Optical gyroscopes experience very little drift with zero motion over long timescales. However, they are generally expensive and heavy, and thus may not always be suitable for hand held portable stabilization devices. As an alternative to optical gyroscopes, low cost MEM (micro-electro-mechanical) devices could be used as IMU sensors. MEM devices are fully integrated and contain all management circuitry to run the electronics providing a simple digital or analogue interface. Multiple axes may be detected by a single component, allowing for very compact sensors and IMUs, and thus enabling optimal placement on the payload. However, such low cost MEM devices may encounter drift over time due to differences in temperature and ageing. They also typically have a higher noise (random walk) than the larger, more expensive designs, such as optical gyroscopes.

To include the lower cost/size sensors into the IMU 400 and assure accuracy of the IMU 400, the drift of the lower cost/size sensors needs to be compensated for and updated frequently. For this purpose, in some embodiments, the IMU 400 includes a 3-axis accelerometer 440, which derives pitch and roll attitudes by measuring acceleration with respect to gravity. These attitude measurements are then used to correct the drift of the gyroscopes 410, 420 and 430. In particular, if the accelerometer-derived pitch and roll attitudes are constant, then it is inferred that the respective gyroscopes should be registering the zero rate.

Further, by integrating the angular motion determined from the gyroscopes, the attitude may also be derived from the gyroscopes. More specifically, changes in attitude require an increase and then decrease in angular rate for a move from a starting point to a finishing point. By integrating the curve of the angular rate (usually numerically) a rotation angle can be derived. Integration methods, such as trapezoidal, Runge-Kutta, and Simpsons, may be employed and are used given a required accuracy and/or available processing resources. The integration is performed periodically, at some interval, to commensurate with the overall control loop, for example, at 400-500 Hz. The orientation angle derived by the gyroscope integration is compared to the angle directly resolved by the 3-axis accelerometer which is references to the Earth's gravity. Periodic corrections are applied to minimize the difference between the two measurements.

As a calibrated accelerometer tends to provide more accurate readings over long timescales than drifting gyroscopes, the accelerometer readings are used to correct the gyroscopes' bias and scale. The bias is set as the error in the zero motion case and is used as a constant rotational offset (inferring motion that wasn't happening). The scale is set as the error in the magnitude of gyroscope derived deflection. Thus, it is possible to construct a sensor fusion algorithm 450, for example based on a Kalman filter and Quaternion angle representation, to derive accurate and compensated readings for motion (angular rate) and pointing direction (attitude). Generally speaking, the sensor fusion algorithm 450 takes the high bandwidth readings from the gyroscopes 410, 420, and 430 and calibrates them to increase their accuracy using the lower bandwidth readings from the accelerometer 440. The two types of sensors are complementary and sometimes their combination is done by what is referred to as a complimentary filter. A number of different structures/combinations of the sensors are possible.

As described herein, the IMU 400 is generally capable of deriving sufficiently reliable measurements of motion and attitude through the combination of different types of sensors to provide for a controlled solution. However, although by combining the sensors some of the inaccuracy effects of using cheaper, smaller sensors, are mitigated, further accuracy issues may be introduced during more complex movements. For example, if the gimbal is carried by a moving vehicle turning a corner, the described IMU 400 may mistake the radial acceleration for gravitational acceleration, thereby incorrectly assessing the motion of the payload by introducing a roll motion to the payload. Such incorrect introduction of the roll motion to the payload is undesirable particularly because deviations of the horizon from the horizontal line are easily noticeable in cinematography.

Figure 5:
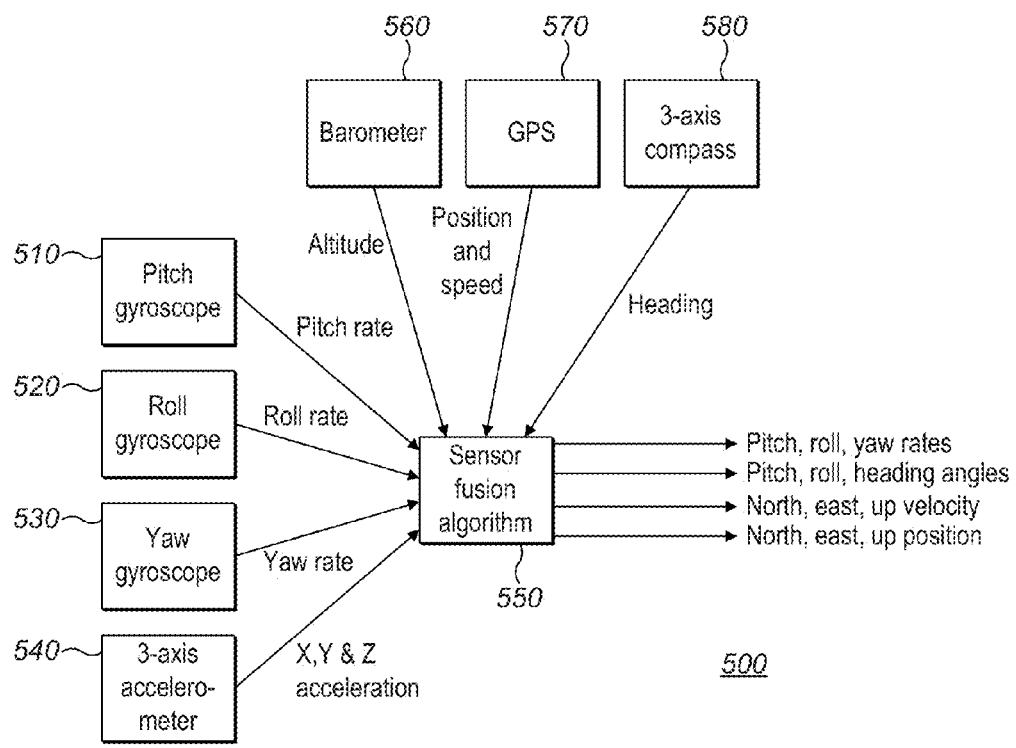
FIG. 5 is flowchart showing the elements of an enhanced IMU, according to some embodiments.

FIG. 5 shows an enhanced IMU 500, in accordance with some embodiments. Similar to the IMU 400, the IMU 500 includes gyroscopes 510, 520, and 530, whose outputs vary according to motion (slew) about their respective orthogonal axes, and 3-axis accelerometer 540. However, unlike the IMU 400, the IMU 500 also includes additional sensors to improve the IMU's performance during lateral or radial acceleration. These additional sensors may include a 3-axis compass 580 and a GPS system 570, which can be used to derive real heading, position and velocity of the gimbal. The real heading is obtained by comparing the gravitational vector with the known Earth magnetic vector. By resolving these vectors, a heading vector is obtained and then used to correct drift of the yaw-axis gyroscope 530. The heading vector provides the IMU 500 a fixed reference for comparing data obtained by the gyroscope. The IMU 400 does not have such a reference and relies on a long term averaging method to deduce a gyroscope offset bias. Further, the GPS derived velocities for East and North direction are resolved together with the heading vector to obtain an acceleration value that is used to correct erroneous measurements and/or gravitational acceleration for a radially moving gimbal base, thereby fixing the horizon drift issue.

More specifically, acceleration readings from the accelerometer 540 are integrated to derive velocity, which is then compared and corrected via the GPS derived velocity using another Kalman filter structure. These velocities may be further integrated and compared with yet another Kalman filter to the GPS position. The net result is a high bandwidth measurement of the position and velocity derived using integration of acceleration and correction with a slower set of readings from GPS. These high bandwidth readings are useful to allow higher order gimbal functions such as automatic correction of the camera's pointing angle. The accelerometer readings are corrected by the above-described process to remove the zero bias drift, similarly to the gyroscope, and enable deriving of an accurate gravity reference vector, uninfluenced by radial acceleration.

In some embodiments, the IMU 500 also includes a barometer sensor 560, which enables the IMU 500 to derive additional height change (altitude) information. In particular, the barometer-based height change information tends to be more accurate than the GPS-based height information. The barometers can resolve heights with accuracy of about 5 cm. The GPS sensors, however, typically resolve heights with accuracy of only 2.5 m CEP (circular error probable), because GPS signals are subject to environmental and reflection interference phenomena, in addition to constantly changing satellite constellations. Although the GPS sensors can provide a long term accurate data, they drift over short time frames, such as periods of seconds. In the IMU 500, the measurements derived by the barometer sensor 560 are then fused with the measurements derived by the accelerometer 540 using a Kalman filter in the manner similar to the GPS data, as described above. The derived GPS data may also be fused with the barometer data to provide for longer term corrections, for example, if there are local air pressure changes due to wind or weather.

Figure 6:
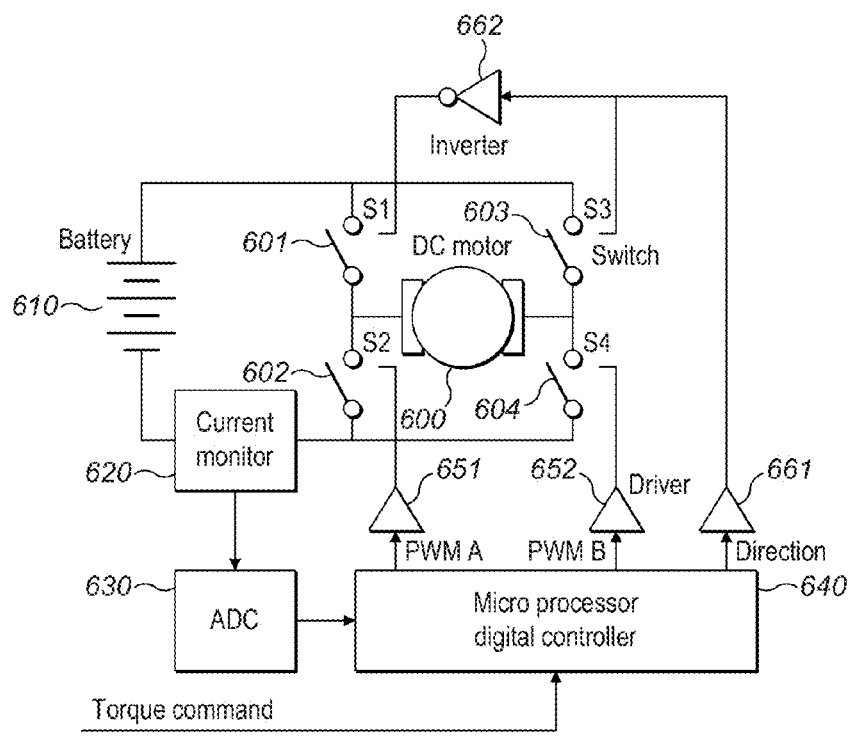
FIG. 6 is a schematic for a power control for a direct current (DC) motor, according to some embodiments.

As discussed above with respect to FIG. 2, in some embodiments, the actuators for rotating the payload are DC motors. FIG. 6 illustrates an example of a power control system for controlling a DC motor 600, according to some embodiments. A bridge containing four switches—switch S1 601, switch S2 602, switch S3 603, and switch S4 604—are arranged to provide reversible current to the motor 600 from a power source, such as a battery 610. In some embodiments, these switches are transistors, such as BJTs (bipolar junction transistors) or more commonly NMOSFETs (N-type metal-oxide-semiconductor field-effect transistors). In the arrangement of FIG. 6, if the switches S1 601 and S4 604 are closed, the motor 600 will run in a forward direction, while if switches S3 603 and S2 602 are closed, the motor 600 will run in a backward direction. If the motor 600 is in a state of motion, such as running forward, reversing the switches to trigger the backward rotation would effectively apply regenerative braking back into the power source via the dynamo effect, until physical reversal occurs.

In some embodiments, to achieve control characteristics with a minimal damped overshoot and fastest response time, the current is regulated through the motor. In particular, by modulating the duty cycle of any one switch in conjunction with the other switch for the required direction, a pulsed averaging may be achieved in combination with self-inductance of the motor, thereby reducing the applied voltage and current in a smooth way. For example, implementing a duty cycle of 50% would half the battery voltage that is needed to be applied to the motor 600. In some embodiments, the PWM frequency is set to a rate, which does not impart high switching losses and approximates a smooth current depending on the motor inductance. Further, by setting the frequency above the audible range, magneto-construction noises, otherwise polluting the soundtrack, may be reduced or removed.

Generating the gate drive for a NMOSFETs switch is typically easier on the low side power rail. Thus, in some embodiments, the bottom switches S2 602 and S4 604 are switched using pulse-width modulation ('PWM'). While the top switches S1 601 and S3 603 select a direction for the motor 600, in conjunction with the PWM switches S2 602 and S4 604, an inverter 662 ensures that only one direction is logically selected by the switches S1 601 and S3 603. A microprocessor 640 generates the PWM pulses, regulating them to achieve a desired drive current and direction. The current may be monitored via a current monitor 620, such as a shunt resistor paired with a hall device, and then fed into the microprocessor 640 using an analogue-to-digital convertor (ADC) 630.

In some embodiments, the motor 600 is designed to operate in a stalled condition and capable of sustained torque, without over heating or burning out. This may be achieved by winding the motor 600 with a sufficiently large number of turns such that the resistance is increased to a point where the full supply voltage can be applied across the motor 600 with an acceptable current. This would be the maximum torque condition, and it allows for a large number of turns which amplify the magnetic effect at a lower current.

It is preferable to match the motor 600 to the supply voltage such that a 0 to 100% duty cycle on the PWM equates to the full torque range. This will provide for inductive smoothing of the PWM signal due to the higher inductance that comes with a larger number of wire turns. At the same time, since the motion of a motor within a stabilization system is typically short (usually less than one second), a large back electromagnetic field (EMF) from the high turn motor winding is unlikely to cause a noticeably detrimental effect.

In some embodiments, the PWM switches are operated in a complementary manor. For example, if the switch S3 603 is energized for the motion in one direction, then the switches S1 601 and S2 602 are switched complementary to each other with PWM such that when the switch S1 601 is on, the switch S2 602 is off, while when the switch S1 601 is off, the switch S2 602 is on. Although this configuration requires additional PWM outputs from the microprocessor, it also provides for improved efficiency, for example, through active fly-wheeling, rather than using the body diode of the N-FET switch (which would otherwise cause a larger drop in voltage). In this configuration, when the complementary N-FET switch is turned on (during the active flywheel period), this would introduce a low resistance and, for typical currents, the voltage dropped would likely be less than 0.1V.

To provide for a quieter, or even silent, and smooth drive and/or to eliminate magneto-constriction noises polluting the filming soundtrack, the PWM is generally set to operate at higher frequencies. For example, in some embodiments, the PWM frequency is set outside the typical audible frequency range, e.g., higher than 20 kHz.

Figure 7:
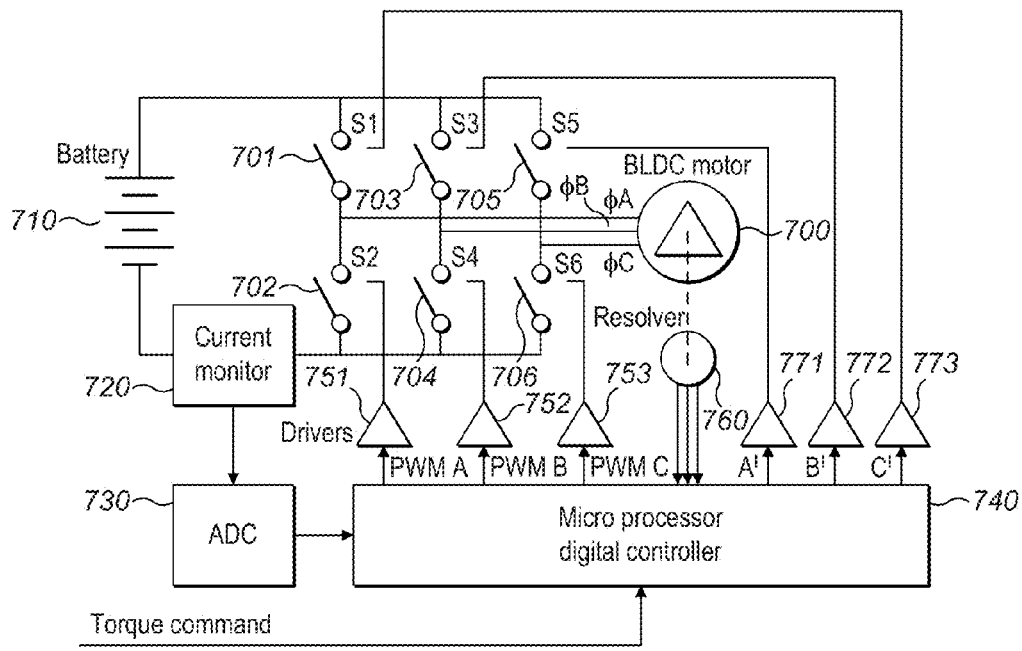
FIG. 7 is a schematic for an enhanced power control for a brushless DC motor, according to some embodiments.

In some embodiments, the actuator is a 3-phase BLDC motor (brushless DC) motor. Such a motor is generally more efficient, capable of achieving higher torque than a 2-phase motor, and is not limited by heating of commutator brushes as with a basic DC motor. FIG. 7 illustrates an example power control system for controlling a 3-phase BLDC motor 700.

A three-phase bridge is provided by six switches S1 701, S2 702, S3 703, S4 704, S5 705, and S6 706. The motor 700 is commutated by observing a resolver 760 that provides angular feedback of a position. The energization of the coils in the motor 700 is arranged to achieve forward or reverse motion using a 6-step commutation sequence with the switch pairs, in conjunction with the resolver 760. The resolver 760 may be an optical, resistive, or hall based device and may have 3 outputs to achieve a resolving code.

The remaining components of the power control system of FIG. 7 operate similarly to the components of the power control system of FIG. 6, described above. In particular, a battery 710 supplies power to the six switches 701 to 706. The current is monitored by a current monitor 720 and fed into a microprocessor 740 using an analogue-to-digital convertor (ADC) 730. Outputs A' 771, B' 772, and C' 773 of the microprocessor 740 are connected to the top switches S1 701, S3 703, and S5 705, while bottom switches S2 702, S4 704, and S6 706 are fed PWM signals from the microprocessor 740.

It should be noted that the motors 600 and 700 and the power control systems for controlling them of FIGS. 6 and 7 respectively are described for illustrative purposes only. Other types of motors and power control systems could be used, depending on the physical and/or commercial requirements. For example, the motor may be constructed as an out-runner to achieve greater torque for a given diameter by nature of magnet geometry, or the motor may be a pancake with exotica magnet arrays based on Halbach array methods to achieve even greater torque levels for a given size. A further example of a motor suitable for implementing embodiments described herein is a conventional induction machine.

Figure 8:
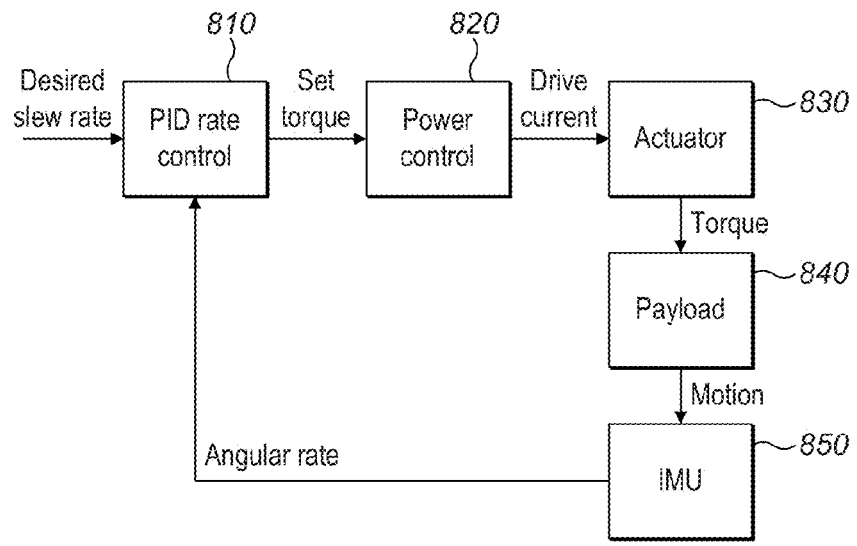
FIG. 8 is a flowchart illustrating an attitude control loop, according to some embodiments.

FIG. 8 illustrates a simple feedback loop for achieving closed loop control. An IMU 850 determines a motion, such as an angular rate, of a payload 840. At a PID (proportional-integral-derivative) rate control element 810, the measured angular rate of the payload 840 is compared with a desired slew (motion) rate provided as an input, to output a 'set-torque' command to a power control element 820. The power control element 820 provides a drive current to an actuator 830, which applies a torque to the payload 840 causing it to accelerate in the desired direction, which is again measured by the IMU 850. As a result, the loop is in closed feedback. Motion that does not equate to the desired slew rate will be amplified as an error and a compensating control signal will be provided to the power control element 820, and the actuator 830.

The control loop for FIG. 8 relies on detecting changes in motion, rather than changes in angle. Therefore, if there is a disturbance that causes the attitude to be jolted to a new position, the control loop of FIG. 8 may not be able to correct for the respective change in position.

Further, during a slow motion control, friction and stiction may interfere with the motion, causing a non-constant rate of movement. This may be undesirable, particularly during filming with a long focal length lens where control is needed to be subtle. Moreover, when using cheaper, smaller MEM sensors, the output of the sensors may be subject to random walk and noise in the determined rate, which may visibly impact their performance with unreliable drift.

Figure 9:
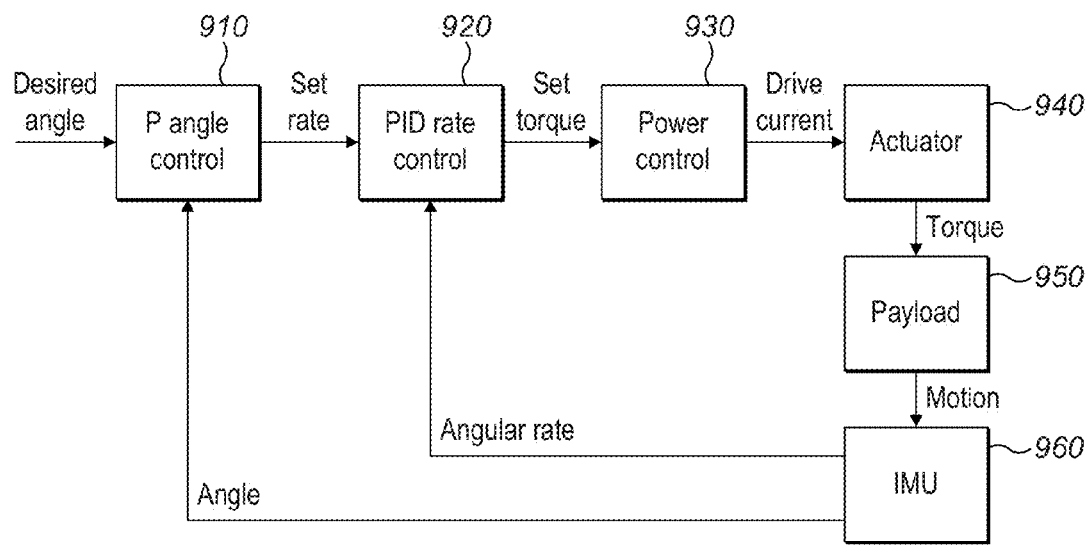
FIG. 9 is a flowchart illustrating an enhanced attitude control loop, according to some embodiments.

FIG. 9 shows an enhanced control loop that includes an angle control loop for addressing some of the problems indicated above. Similarly to the control loop of FIG. 8, in FIG. 9, a PID rate control element 920 receives, as input, a desired motion rate, as well as a detected angular rate of a payload 950 from an IMU 960. The PID rate control element 920 then sets a torque value as an input to a power control element 930, which subsequently sets the required drive current for an actuator 940 to achieve the torque value. However, unlike the attitude control loop of FIG. 8, in the control loop of FIG. 9, in addition to considering motion, desired (commanded) and detected (measured, derived) angles of the payload 950 are also considered. More specifically, a P (proportional) angle control element 910 receives, as input, a desired angle for the payload 950, as well as a detected angle of the payload 950 as determined by the IMU 960. The P angle control element 910 then sets a rate for the motion that would result in the desired angle. The proportional loop senses an error between the desired and measured angles and aims to keep this error to a minimum. In this manner, errors due to friction, stiction, and random walk are effectively cancelled out by means of the absolute attitude being the main control variable.

Figure 10:
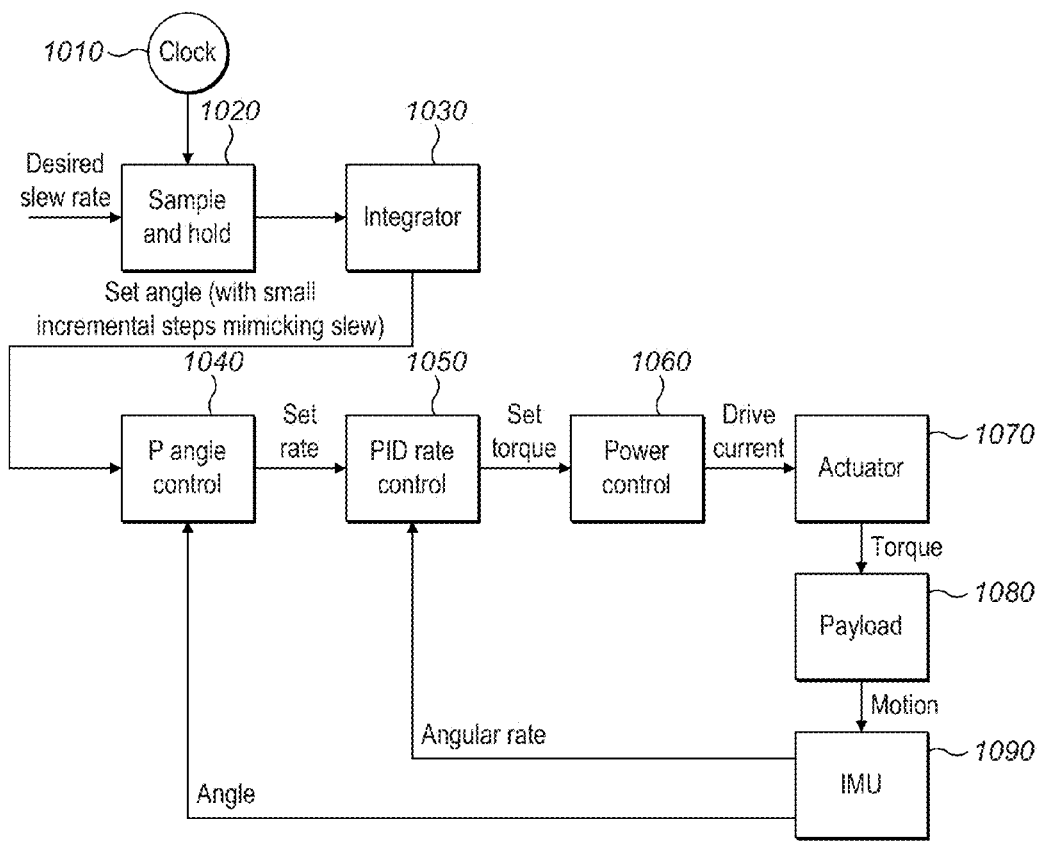
FIG. 10 is a flowchart illustrating an attitude control loop with an input mechanism, according to some embodiments.

Typical joysticks for controlling the direction of a camera determine a slew rate based on the joysticks' position. As the control loop of FIG. 9 takes an angle as input, rather than a desired slew rate, the slew rate output of a joystick should be converted to preferred angles. FIG. 10 illustrates how the control loop of FIG. 9 could be adapted to take a slew-based input. A desired slew rate from a control input, such as a joystick, is sampled at a sample and hold element 1020 at a frequent interval. This frequent interval is determined, for example, by a clock 1010. In some embodiments, the frequent interval is set between 400 Hz and 500 Hz. However, this range is exemplary only, and the frequent interval may be below 400 Hz or above 500 Hz.

The sampled slew rate is then integrated at an integrator 1030, using a constant period, which outputs a constant change in pointing angle. The change in this pointing angle mimics slew but is actually a number of sequentially different pointing commands that are closely related. These changing pointing angles are sent to a P angle control 1040, which also receives the detected angle of a payload 1080 as determined by an IMU 1090. The P angle control 1040 sets a rate for the motion that would result in the desired angle. It then sends the required rate of movement to a PID rate control 1050 unit, which also receives a detected angular rate of the payload 1080 from the IMU 1090. The PID rate control 1050 sets a torque value as an input to a power control 1060, which subsequently sets the required drive current for an actuator 1070 to achieve the torque value.

Figure 11:
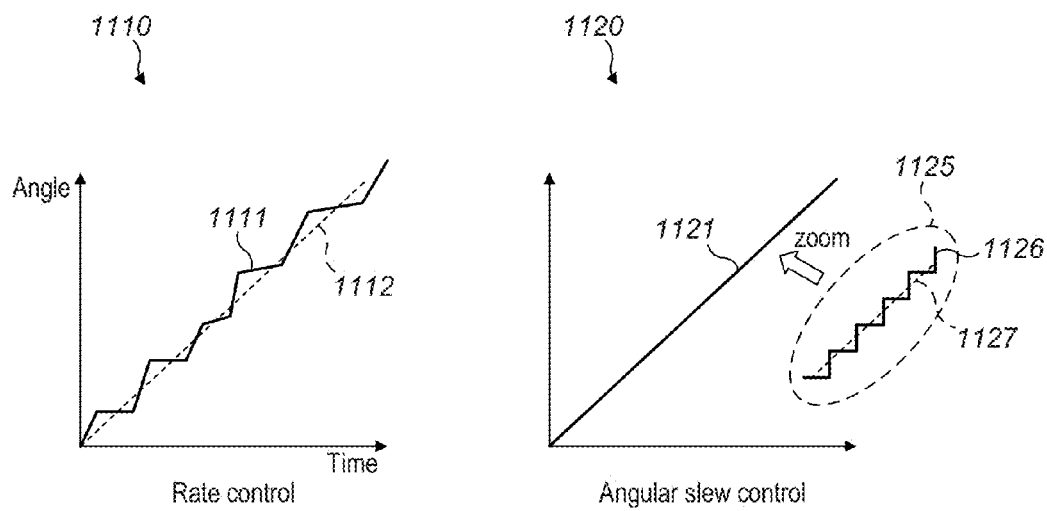
FIG. 11 shows a comparison of stabilization performance between two methods of controlling the stabilization system, according to some embodiments.

FIG. 11 illustrates the differences in performance of the rate control system illustrated in FIG. 8 and the angular slew control system illustrated in FIG. 10. Graph 1110 shows variations in angle over time for a rate control system where mechanical stiction and sensor random walk results in deviations of the resultant slew 1111 from the desired, smooth slew 1112. Graph 1120 shows the variations in angle over time for an angular slew control system. The actual motion 112, as shown, is much smoother than the corresponding motion 1111 of the graph 1110. This is because the attitude (or angle) loop automatically compensates for erratic errors and leaves only the minor ripple associated with the small steps, as shown in the magnified portion 1125 where the actual motion 1126 deviates from the desired motion 1127 by small steps. For example, to slew at 10°/s at 500 Hz requires steps of only 0.02° per step, resulting in the appearance of very smooth movement.

Figure 12:
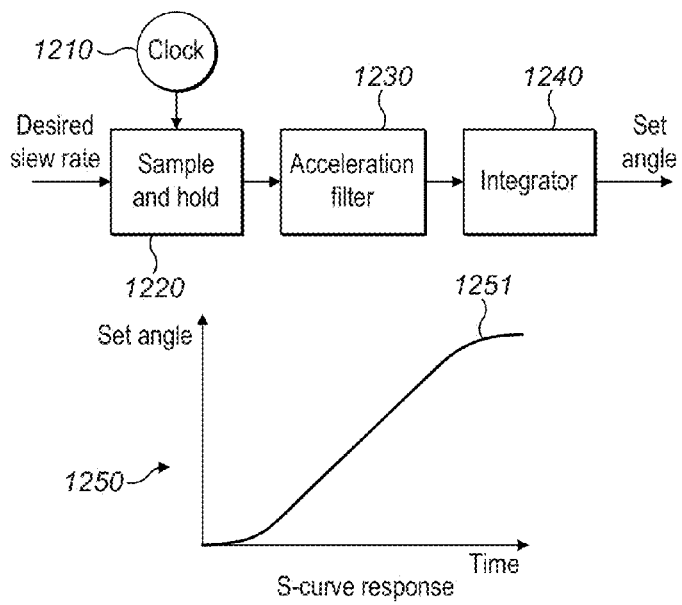
FIG. 12 illustrates an acceleration filter for modifying input commands, according to some embodiments.

In some embodiments, the input command, such as an operator command provided via a joystick, may be modified or filtered to result in a desired control effect. For example, the operator may wish to reduce the jerkiness of the input signal, and to have a gradual start of motion, followed by a period of constant motion, and then a gradual stop of motion. Such an effect may be difficult to achieve manually. FIG. 12 shows how to improve or alter the input received at the control loop by introducing a filter into the loop.

In particular, as in FIG. 10, in FIG. 12, a sample and hold element 1220 samples a desired slew rate at a frequency determined by a clock 1210. However, unlike FIG. 10, where the sampled rate is inputted directly into an integrator, in FIG. 12, the sampled rate is inputted into an acceleration filter 1230 for filtering, and only the filtered signal is then integrated at an integrator 1240, which sets the angle for the rest of the control loop. Graph 1250 shows a possible response curve 1251, illustrating how an input slew rate can be filtered to produce a more desirable, smoother result.

In some embodiments, the filter 1230 is based on a symmetrical non-causal least squares filter (similar to a Wiener filter), which has length, and thus memory or periodic samples. Each new sampled rate is introduced into the filter, which acts as a shift buffer. The filter 1230 uses a straight line fit and takes values at the mid-point of that line fit. When the buffer is full of similar samples, the fit will be the desired (commanded) input value. For example, if the buffer is full of 20 zeros, and a new sample of 10°/s value is introduced, then the slope of the least square fit will be shallow and give a mid-point underestimate of the required value. If the buffer, however, is full of 20 samples, each having a value of 10°/s, then the slope will be flat and give a projected mid-point of 10°/s as commanded. If the buffer is intermediately full of similar samples, the slope of the fit may be positive or negative and changes in a way of acceleration or deceleration—the commanded output versus the commanded input. The filter 230 may use a mixture of historical samples, which were not commanding a motion, and the more recent samples, which were commanding a motion. Once the filter 1230 is flushed with constant input values, the output is also constant and unchanging. If motion is commanded to stop, then the filter gradually flushes through to give zero at the output. The smoothing of the filter has a desired characteristic, which may be tailored by altering the length of the filter. Other, more numerically efficient filters such as Savitzky-Golay, or FIR based, may also be employed as the filter 1230.

Figure 13:
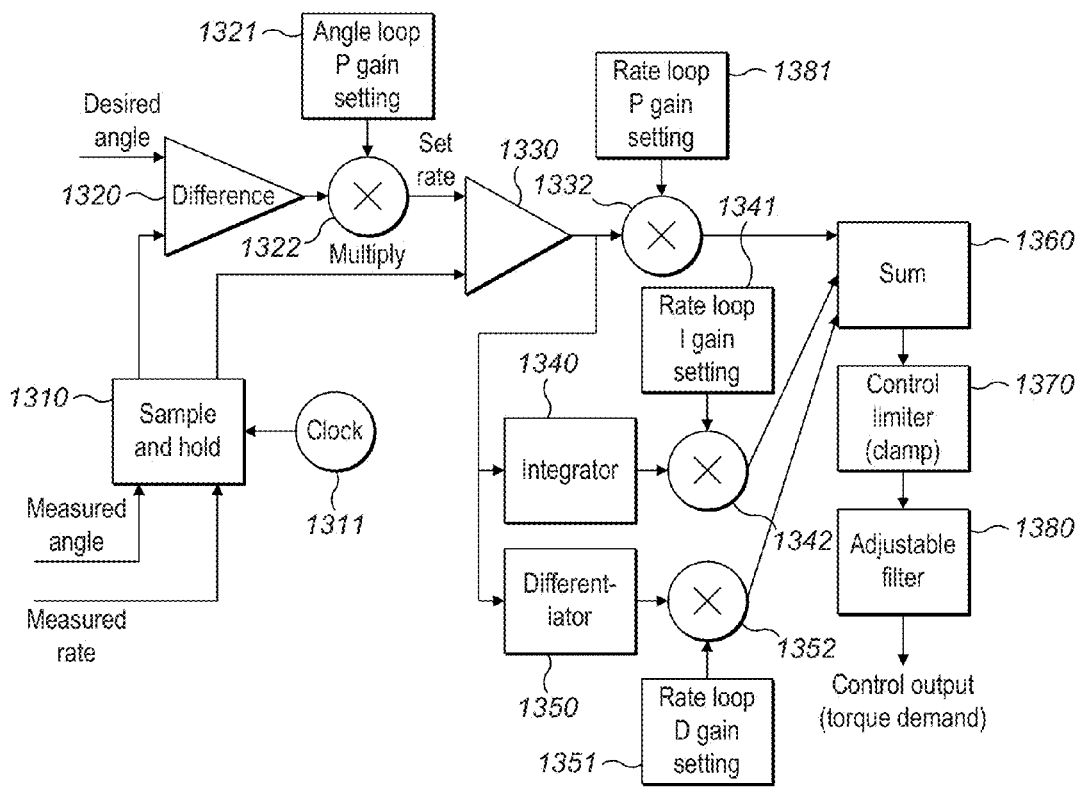
FIG. 13 is a detailed flowchart of the elements in a control loop for stabilizing a stabilization system, according to some embodiments.

FIG. 13 illustrates a more detailed diagram of a digital PID control loop, according to some embodiments. Measured IMU angular rate and angle are sampled and held at 1310 at a control loop tick rate determined by a clock 1311. In some embodiments, the control loop tick rate is in sympathy with the drive updates to the actuator. The difference between the measured angle and the desired set angle is calculated at 1320, and the resulting error is multiplied at 1322 by an angle loop P (proportional) gain 1321 to generate a command set rate for an inner loop.

The command set rate from the multiplier 1322 is subtracted at 1330 from the measured IMU angular rate 1310 and the resulting error is multiplied at 1332 by an inner P rate loop gain 1331. The same error is also integrated at 1340 and differentiated at 1350 at each clock update, where the output of the integrator 1340 is multiplied at 1342 by an integral (I) gain setting (constant) 1341, while the output of the differentiator 1350 is multiplied at 1352 by a differential (D) gain constant 1351. The results of these three multiplications 1332, 1342, and 1352 are summed at an aggregator 1360, forming a PID loop for the inner rate control.

In some embodiments, the output of the aggregator 1360 is clipped at the control limiter 1370 to reduce potential problems with saturation (such as demanding too much torque). The output may also be fed through an optional filter 1380, which is a digital low pass or notch filter based on FIR (finite impulse response) and IIR (infinite impulse response) techniques. The filter 1380 is generally configured to alleviate issues associated with structural resonance, which might otherwise disturb the control loop response. For example, the filter 1380 may be configured such as to cut off prior to a control instability point or notch out a hi-Q peak at some frequency which could cause mechanical resonance. In some embodiments, a rate limiter (not shown) is included into the outer control loop to limit the slew rates—the command set rate from the multiplier 1322. The output of the aggregator 1360 eventually reaches a control output to power an actuator and cause movement.

In some embodiments, the gain settings 1321, 1331, 1342, and 1352 of the PID loop are adjustable. In this manner, a desired control response with minimal overshoot and rapid response, without instability, may be achieved and/or adjusted. The P gain sets the overall loop gain to reduce disturbance errors. The I gain sets the accuracy for small errors on longer time scales, thereby effectively setting a time constant. With the I gain, finite errors may be cancelled out, with absoluteness. The D gain sets some predicted output, particularly helping with fast motion, and is generally used to improve the speed response. In some embodiments, the control loop is based only on the two P loops. However, in some other embodiments, the I and D gains are introduced for better performance.

Figure 14:
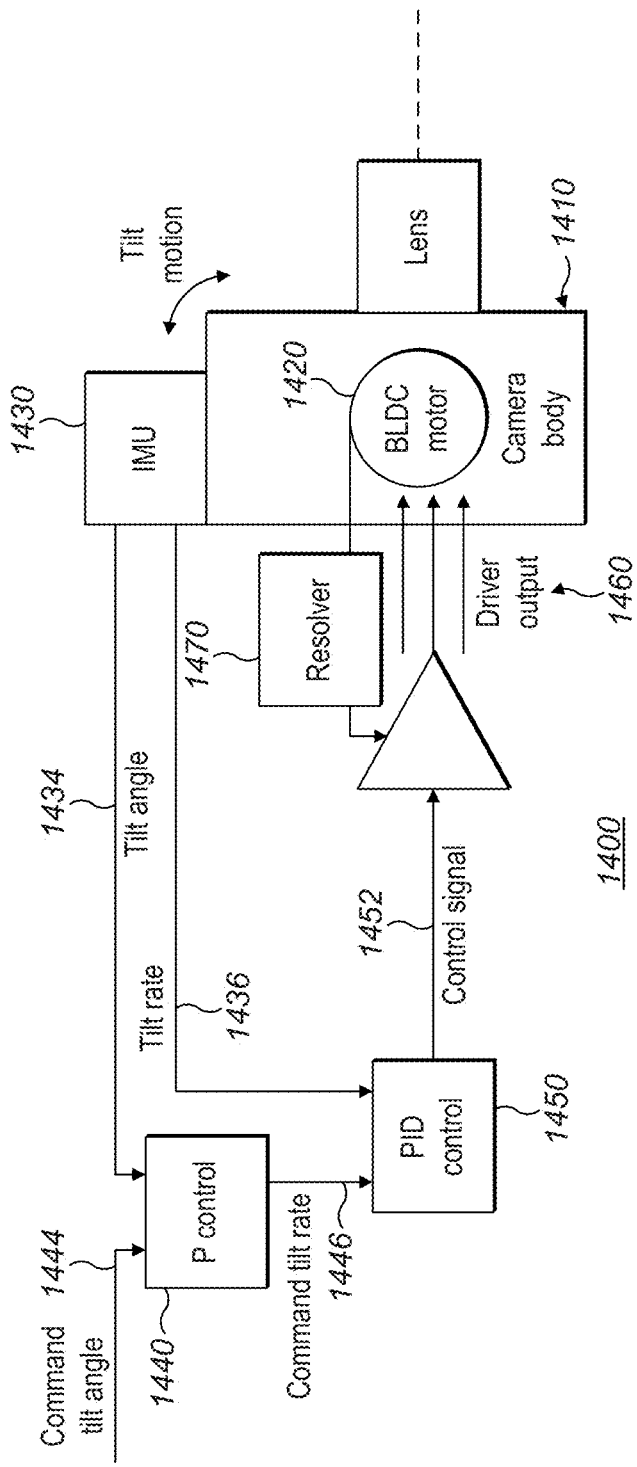
FIG. 14 is a flowchart of a single axis stabilization controller for controlling a pointing angle of a camera, according to some embodiments.

FIG. 14 illustrates a single axis stabilization control process 1400 for controlling a tilt angle of a payload, e.g., a camera 1410, housed by an active stabilization system (gimbal). The process 1400 controls the tilt angle of the camera 1410 using a brushless DC motor 1420, determining required adjustments based on measurements obtained by an IMU 1430. The IMU 1430 is mounted on the body of the camera 1410 or otherwise co-located with the camera 1410 (e.g., on a camera head) so as to be able to sense (measure, determine, provide, derive, or the like) position and velocity of the camera 1410. As discussed in more detail with respect to FIG. 9, such an IMU comprises a GPS, a 3-axis accelerometer, a 3-axis gyroscope, a 3-axis compass, and a barometer and incorporates a sensor fusion algorithm that enables the IMU 1430 to accurately derive a 3-dimensional (3D) position and a translational velocity associated with the camera. In some embodiments, the measurements acquired by the IMU are cm and cm/s accurate.

The IMU 1430 updates its measurements at a fixed update rate. Not all measurements, however, are necessarily updated at the same rate. For example, measurements derived from data sensed by the accelerometer may have a different update rate than measurements derived from data sensed by the gyroscope (e.g., 160 Hz and 500 Hz respectively). Thus, when the update rates differ for different IMU sensors, a single measurement corresponding to a lower update rate may be used in combination with different measurements corresponding to a higher update rate.

Update rates employed by the IMU overall and its components are generally depended on the technical characteristics and/or requirements of the IMU components, desired accuracy, computation characteristics, computation requirements, and/or the like. For example, typical MEM's based gyroscopes are able to provide readings upwards of 1 kHz. Further, using a lower update rate to obtain the accelerometer measurements (e.g., 160 Hz) than to obtain the gyroscope measurements (e.g., 400-500 Hz) allows the IMU to derive reliable measurements from both sensors, and also to conserve computing power and memory by not performing computations that would not otherwise improve the IMU reliability or accuracy. Also, small gimbal structures may require faster control than larger, heavy units that inherently have a greater inertial damping. Accuracy achieved by sampling a greater number of readings to enable better averaging may need to be balanced against a control bandwidth greater than frequencies which may be constituent in disturbance noise. In some circumstances, however, control achieved at lower rates, such as 50 Hz, may be sufficient, for example in an active stabilization system mounted on a vehicle.

The stabilization control process 1400 employs a closed loop electro-mechanical feedback based on the proportional-integral-differential control technique. Both the tilt angle (attitude) and the tilt rate (motion, slew) of the camera 1410 are considered to determine the tilt angle update. The stabilization control process includes two nested loops, an outer loop for correcting angle errors and an inner loop for correcting control errors and stabilizing the tilt motion.

The outer, angle-based loop includes a P control element 1440, which receives, as input, a tilt angle 1434 of the camera 1430, as detected by the IMU 1430, and a command tilt angle 1444 for the camera 1410. The command angle 1444 generally reflects intentions of the camera operator, actual or remote, at the time. More specifically, the command tilt angle 1444 may be set by a remote operator via a remote link, by the camera operator via a control device, such as a thumb joystick, or derived from the camera operator's intentions expressed by the operator lifting and steering gimbal handles, such as the handles 113 shown in FIG. 1, and determined based on the gimbal joint angles. The P control element 1440 compares the command and measured tilt angles and sets a command tilt rate 1446 for the motion that would result in the command tilt angle. In particular, P control element 1440 senses an error between the command and measured tilt angles 1444 and 1434, amplifies the error by a proportional gain constant, and feeds the amplified error into the inner loop, thereby minimizing the angle error.

The inner, rate-based closed feedback loop includes a PID control element 1450, which receives, as input, a tilt rate 1436 of the camera 1410, as detected by the IMU 1430, and the command tilt rate 1446, as set by the P control element 1440. The PID control element 1450 compares the two tilt rates to detect a control error, which it amplifies using proportional, integral, and differential constants to set a control signal 1452 (such as a torque value) for controlling movement of a brushless DC motor 1420 (or another actuator, such as a motor, a gearbox, a belt reduction drive, or the like). In particular, the output of the PID control element 1450 is fed to the brushless DC motor 1420 via a driver output element 1460 to form an overall closed loop feedback circuit, thereby causing acceleration, deceleration (brake), or a reverse movement of the brushless DC motor 1420. The driver output element 1460 outputs 3-phase currents to the motor 1420 and forms a local control loop together with an angle resolver 1470 for controlling the 3-phase currents accurately and dependent on the motor phase angle. In some embodiments, the outputs of the driver output element 1460 effectively control a torque generated by the motor 1420 to accelerate/decelerate gimbal's tilt rotation.

Generally, the stabilization control process has a fixed update rate (e.g., 400 Hz) so as to enable discrete control decisions by the stabilization controller 1400. However, the update rate may be slower, or faster, depending on a specific design of the actively stabilized gimbal. Further, in some embodiments, the stabilization control process 1400 is digital and implemented using software.

Depending on a particular application, the stabilization control process 1400 is replicated for some or all of the tilt, roll, and pan axes with the servo motors employed for the tilt, roll, and pan axes respectively. In response to the commands issued by the stabilization control processes for the respective axes, these motors operate to correct disturbances to the camera's pointing direction, automatically, such as to maintain a constant pointing angle (attitude) for each of the axes.

Figure 15:
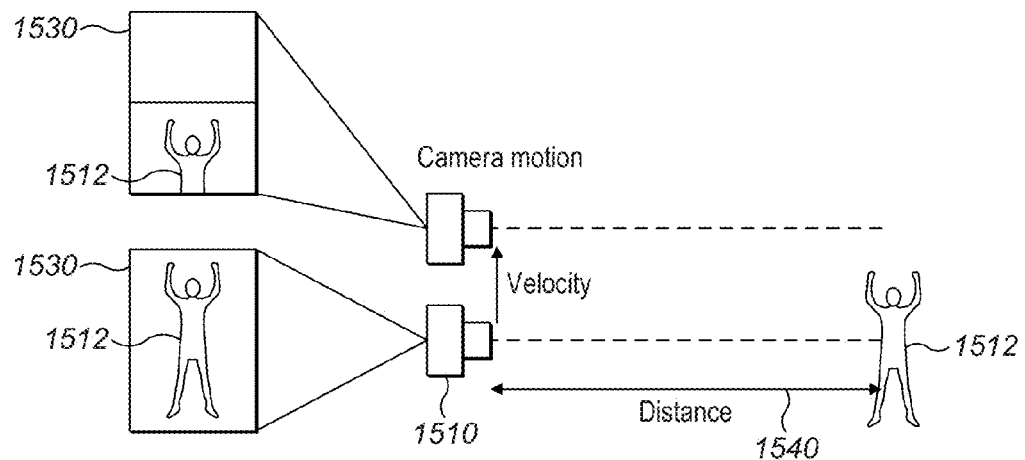
FIG. 15 illustrates how translational movements affect camera's field of view when the camera's pointing angle is maintained.

Accordingly, the actively stabilized gimbal (system) is designed to maintain a constant pointing angle for the respective camera. However, for close-up shots and, in particular, where the gimbal is a hand-held device, effects of the translational movements become noticeable in the resulting footage and may include a filming target moving outside the camera's field of view, partially or completely. FIG. 15 illustrates such an effect. As shown, a translational upward movement (vertical translation) of a camera 1510 results in a filming target 1512, such as an actor, being partially removed from the camera's field of view 1530. Since the active stabilization system maintains, as it is designed to do, a constant pointing angle for the camera 1510 throughout and subsequently to the upward translational movement, the filming target 1512 becomes partially removed from the camera's field of view.

To prevent such an effect, normally, a camera operator manually changes settings for the camera's pointing angle (e.g., using a joystick), or otherwise controls the camera, so as to keep the filming target within the camera's field of view. However, in a scenario involving fast translation movements or a close-up shooting, it is practically impossible for the operator to achieve and/or maintain a perfect frame shot using the manual methods.

To address this problem, in some embodiments, the active stabilization system supports a translation-compensation mode for compensating for translational movements of the camera by correcting automatically the pointing angle of the camera. When the translation-compensation mode is activated, the active stabilization system corrects the tilt angle of the camera to compensate for vertical translations of the camera and/or the pan angle to compensate for horizontal translations. In some embodiments, the camera operator is enabled to active/de-activate the translation-compensation mode as a whole and/or for individual axes and corresponding methods and components (units, elements, and the like) described herein.

Generally, when the translation-compensation mode is activated for tilt and/or pan axes, the active stabilization system obtains measurements associated with a detected translational movement of the camera for the respective axis(es) and a distance from the camera to the filming target. Based on the obtained measurements, the system determines a correction update (such as an angular rate and/or a pointing angle) for adjusting the camera's pointing angle to correct for the translational movement. Preferably, the system adjusts/corrects the pointing angle gradually, in incremental steps, thereby providing for a smooth adjustment motion. To enable this correction/adjustment process, the control loop of the stabilization control process, such as the enhanced control loop of FIG. 14, is modified.

Figure 16:
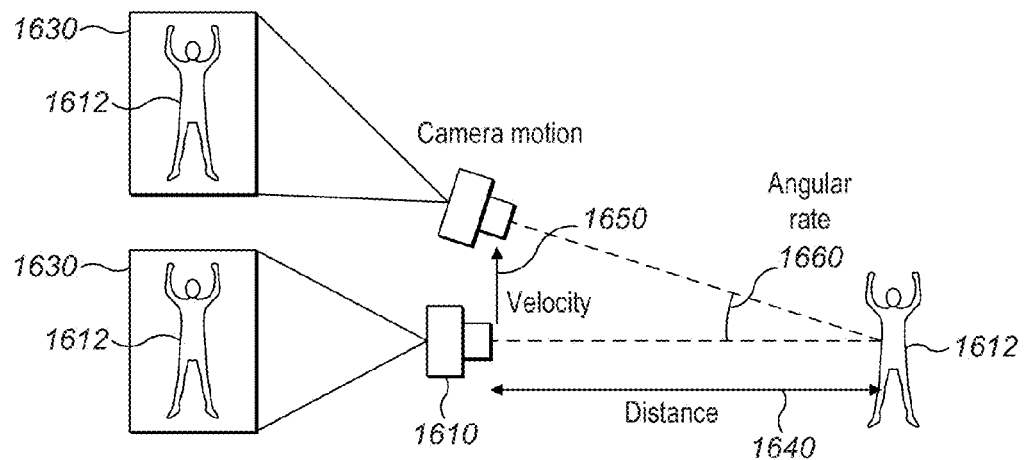
FIG. 16 illustrates how effect of translational movements can be compensated by adjusting a camera's pointing angle, according to some embodiments.

FIG. 16 illustrates a camera 1610, which has experienced upward, substantially tangential, translation movement similar to the movement of the camera 1510 of FIG. 15. However, unlike the camera 1510, the pointing angle of which has been maintained constant by the active stabilization system, resulting in a partial removal of the filming target 1512 from the camera's field of view 1530, the camera 1610 retained its filming target 1612 within its field of view 1630. To achieve this result, the upward movement of the camera 1610 is compensated by the downward correction of the camera's pointing angle, changing the pointing direction of the camera by a rate of change (angular rate) 1660.

For a vertical, substantially tangential displacement, such as in FIG. 16, the relation between the distance from the camera 1610 to the filming target 1612 and the camera vertical velocity 1650 can be described by the following equation:

$$\omega = -v_{up}/x \quad (1),$$

where ω is the angular rate 1660, $v_{up}$ is the vertical (translational) velocity 1650, and x is the distance 1640 from the camera 1610 to the filming target 1612. The equation (1) is similar to the equation for describing a body rotating around a center point. The equation (1) is appropriate for calculating the angular rate ω where the vertical translation of the camera 1610 is substantially tangential to a radius defined by a direct line connecting the camera 1610 and the filming target 1612 and that line is substantially horizontal. In other words, if the pointing angle is substantially horizontal, i.e., close or about to 0° degrees, a vertical displacement may be interpreted as being substantially tangential. A particular acceptable range depends, for example, on the lens field of view. The goal is to keep the subject (filming target) within the video frame by some percentage, e.g., +/−5°, such that a vertical displacement may be interpreted as being substantially tangential. Accordingly, in such circumstances, the translational velocity $v_{up}$, as determined by the IMU, is substantially similar to the tangential velocity of the camera 1610, thus making the equation (1) appropriate for calculating a correction update for adjusting the pointing angle of the camera. For a scenario depicted in FIG. 16, the correction update or value is the angular rate 1660.

Figure 17:
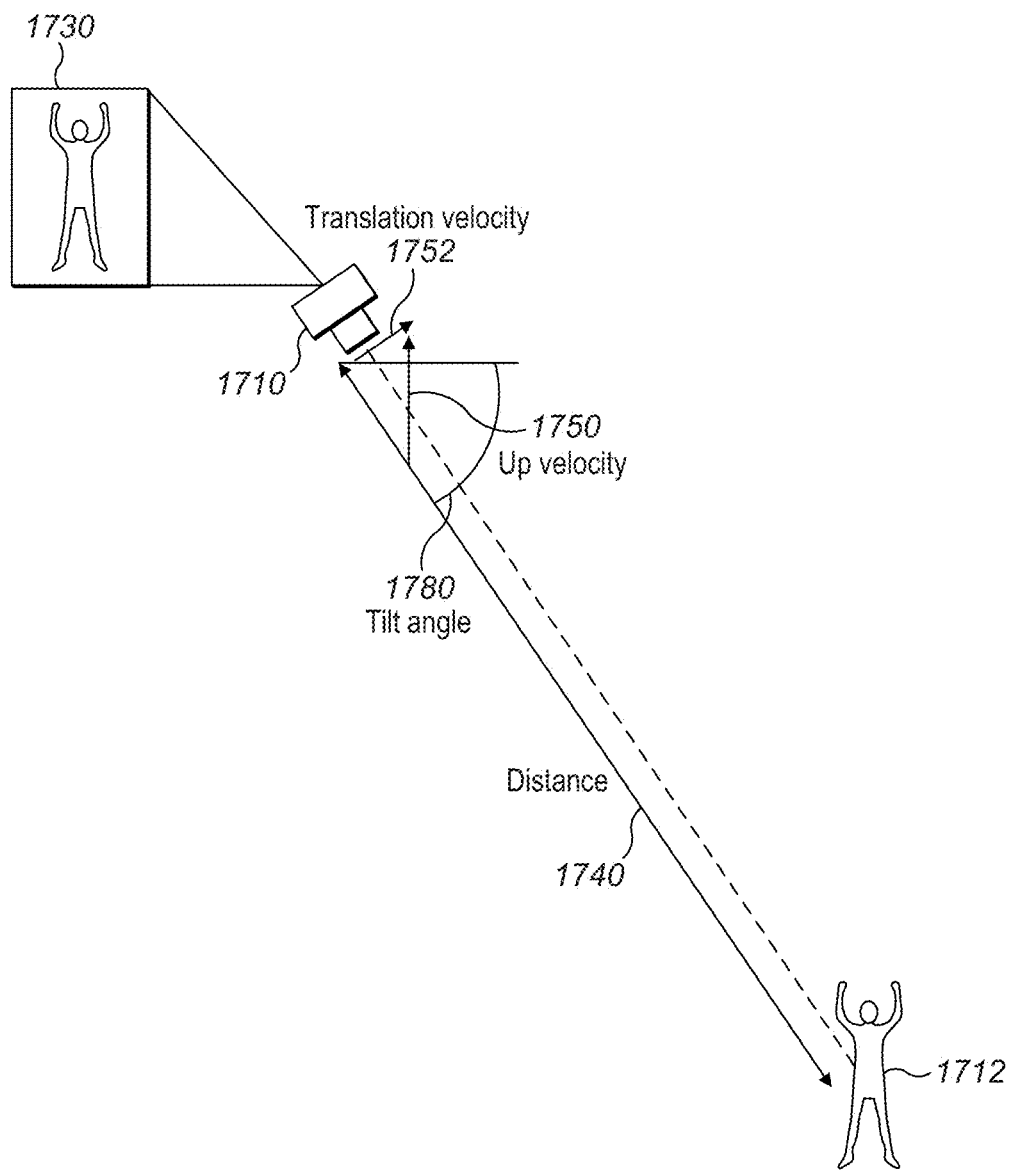
FIG. 17 illustrates a camera elevated in relation to a filming target and associated measurements, according to some embodiments.

To compensate for non-tangential vertical translational movements and/or translational movements of an elevated camera, in some embodiments, elevation measurements of the camera in relation to the filming target are considered in addition to the velocity and distance measurements when the correction value is determined. FIG. 17 illustrates a scenario of a camera 1710 being elevated in relation to a filming target 1712. That is the camera 1710 is in a look-downward mode. A pointing angle of a look-downward camera, such as the camera 1710, requires a smaller adjustment than a pointing angle of a camera pointing substantially horizontally, such as the camera 1610 of FIG. 16, to compensate for a translational movement of the same magnitude. In other words, the higher (or the lower) the elevation of the camera is in relation to the filming subject, the smaller are the adjustment to the camera's pointing angle, required to maintain the filming target in the camera's field of view. The pointing angle adjustments tend towards zero when the camera is almost above (or below) the filming target, i.e., the camera's pointing angle is close to +/−90 degrees).

To factor this effect into the angle correction process, the current pointing angle of the camera 1710 is determined and used, in addition to the distance 1740 between the camera 1710 and the filming target 1712 to determine the correction update. For example, in some embodiments, a tangential velocity 1752 is calculated first for the pointing angle using the equation:

$$v_{tangential} = \cos(\theta) \times v_{up} \quad (2),$$

where $v_{up}$ is the vertical velocity 1750 derived by the IMU and $\theta$ is the current pointing angle of the camera. The calculated tangential velocity is then used in conjunction with the distance 1740 to determine an angular correction rate (the correction update), using the equation (1). In other words, the modified equation (1) is as follows:

$$\omega = -\cos(\theta) \times v_{up}/x \quad (3).$$

The equation (3) simplifies to the equation (1) when the camera's pointing angle is horizontal, i.e., 0 degrees.

Similar principles are applicable to correcting a pan angle of the camera to correct for horizontal displacements. That is, a correction update/value for compensating for a motion that is substantially tangential to a radius defined by a line connecting the camera and the filming target or a horizontal non-tangential motion is determined using methods similar to those described with respect to FIGS. 16 and 17 respectively. In particular, the pan angle of the camera is related by compass and GPS derived measurements. Using the distance from the camera to the filming target, the camera's velocity, the actual camera pointing direction, local compass heading, and the GPS measurements, the radius and coordinates for the filming target are determined, and the correction update for adjusting the pointing angle to compensate for the horizontal displacement is calculated.

As described above, the distance from the camera to the filming target is needed to determine correction updates for compensating for camera's vertical and horizontal displacements. To determine the distance measurement, in some embodiments, the active stabilization system (gimbal) includes a range sensor that actively measures the distance between the camera and the filming target. Such a range sensor is generally housed within the active stabilization system. The range sensor may be attached to the camera itself or be otherwise co-located with the camera lens or the camera so as to be able to measure the distance from the camera to the filming target with sufficient accuracy of order +/−0.25 m. Thus, in some embodiments, the range sensor is mounted on a camera head, such as the mounting arrangement 150 of FIG. 1, and is aimed at a center of the camera's field of view.

Different types of range sensors are suitable to measure the distance between the camera and the filming target, including, but not limited to ultrasonic, laser, infrared, optical, and/or any other sensor that is workable over distances for which the translational effects are noticeable in the captured video. The sensor type and its detection profile vary between different embodiments and are selected to suit a specific application of the active stabilization system, system specifications, user's preferences, and the like. For example, ultrasonic sensors have a good measuring distance range, such as 10 m, and an adjustable beam profile that is suitable for the most common filming scenario of the filming target being a person.

Other devices may be used in addition to, or instead of, the range sensor to determine or estimate the distance from the camera to the filming target, including, but not limited to GPS devices for detecting GPS locations of the camera and filming target, and the like. Alternatively, or in addition, the distance may be inferred based on the focus control settings of the camera lens. By calibrating the focus control with the real distance, an approximate distance (range) from the camera to the filming target can be derived. The actual camera focus may be automatically controlled or manually adjusted by an operator, on the camera or in some embodiments, a remote operator is able to adjust camera focus using a remote handset. The remote operator selects desired focus settings, and corresponding focus control information is passed to a camera controller, via a remote link, e.g., Wi-Fi, Bluetooth, or the like, to adjust the focus control settings for the camera. Further, the focus control information may also be provided to the active stabilization controller for estimating the distance between from the camera to the filming target.

Furthermore, in some embodiments, an approximate distance from the camera to the filming target is pre-inputted/pre-set, e.g., by the camera operator. Pre-inputting/pre-setting the distance is appropriate, for example, if the location and position of the camera do not change significantly in relation to the filming target during filming, on a rehearsal, a planned shoot, or the like.

Figure 18:
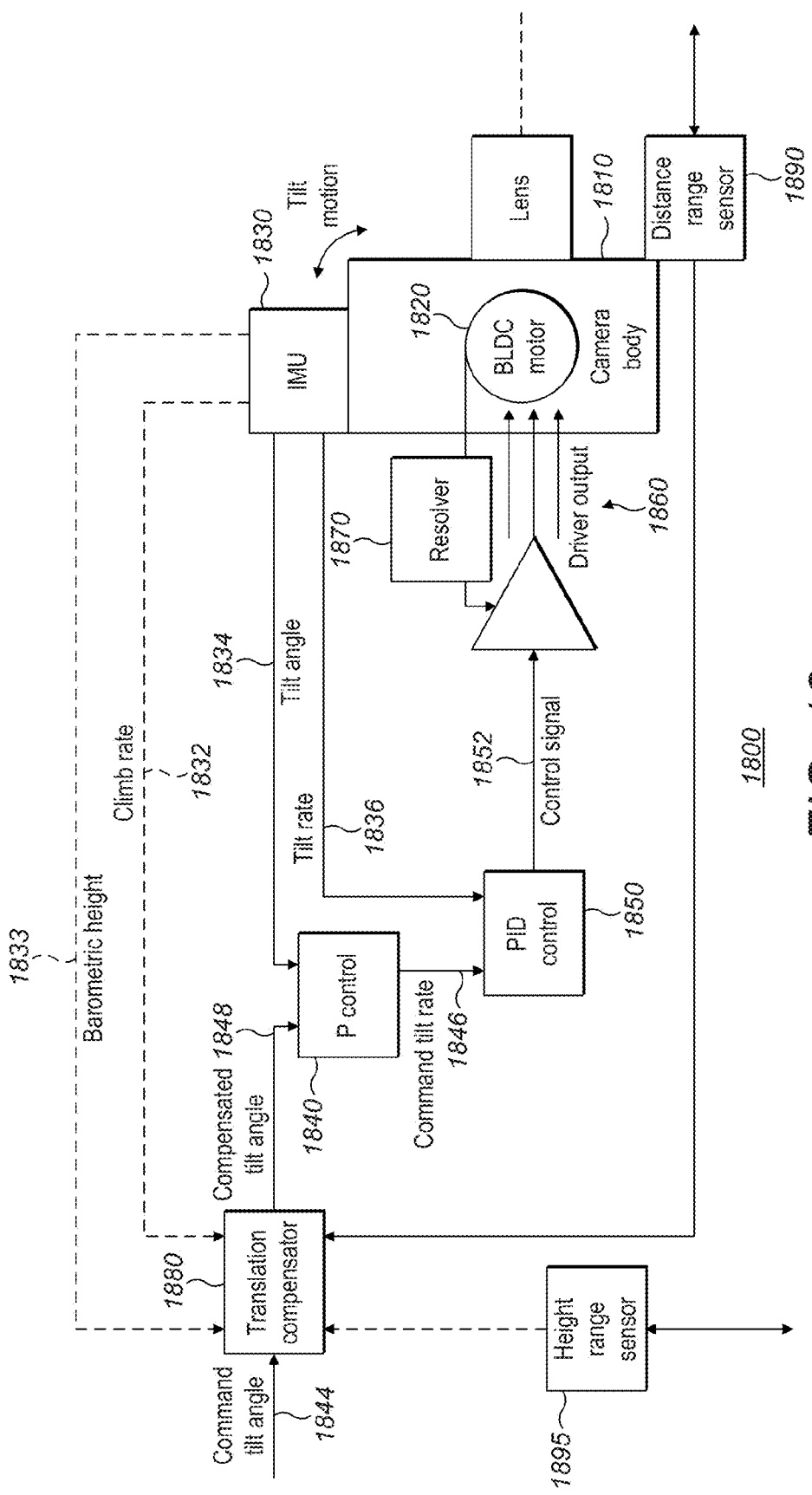
FIG. 18 depicts a single axis stabilization controller configured to enable automatic correction of the camera pointing angle to compensate for translational movements, according to some embodiments.

To enable an active stabilization system to automatically correct the pointing angle of the camera so as to compensate for translational movements of the camera, the stabilization control processes, such as the single axis stabilization control process 1400 of FIG. 14, are modified. FIG. 18 shows suitable modifications for a single axis (tilt axis) stabilization control process, enabling automatic adjustment of the camera tilt angle to correct to vertical translational movements so as to keep the filming target within the camera's field of view, in accordance with some embodiments. Similar modifications can be made to a pan axis stabilization control process for controlling the pan angle of the camera.

More specifically, similarly to the stabilization control process 1400, a stabilization control process (controller) 1800, implements an inner rate-based PID loop including a PID control element 1850, which receives, as input, a tilt rate 1836 of a camera 1810, as detected by an IMU 1830, and a command tilt rate 1846 set by a P control element 1840. The PID control element 1850 compares the two tilt rates to detect a control error, which it amplifies using proportional, integral, and differential constants to set a control signal 1852 for controlling movement of a brushless DC motor 1820. The output of the PID control element 1850 is then fed to the brushless DC motor 1820 via a driver output element 1860 to form an overall closed loop feedback circuit, thereby causing acceleration, deceleration (brake), or a reverse movement of the brushless DC motor 1820.

Further, similarly to the stabilization control process 1400, the stabilization control process 1800 implements an outer angle-based P loop with a P control element 1840, which receives, as input, a tilt angle 1834 of the camera 1810 detected by the IMU 1830. However, in the outer P loop of FIG. 14, the P control element 1440 compares the tilt angle 1434 directly to the command tilt angle 1444, representing an angle commanded by the camera operator, e.g., via a remote controller, to issue the command tilt rate 1446. In contrast, the P control element 1840 compares the tilt angle 1834 to a compensated (modified, adjusted, and the like) command tilt angle 1848 to issue the command tilt rate 1846 for the PID control element 1850.

The compensated command tilt angle 1848 is generally the command tilt angle 1844 that has been modified by a translation compensator 1880 so as to compensate for a detected translational movement and retain the filming target 1812 in the camera's field of view. As discussed below in greater detail, the translation compensator determines adjustments (udpates), which it applies to the command angle 1844 to determine the compensated command tilt angle 1848, based on a distance between the camera 1810 and the filming target 1812 (measured, estimated, or pre-determined) and a translational velocity (climb rate) 1832, current pointing angle, and/or other measurements acquired by the IMU 1830 in association with a translational movement and/or a height, such as a barometric height 1833, acquired by the IMU 1830 or measurements of a height range sensor 1895. In some embodiments, the active stabilization system includes a distance range sensor 1890 that measures the distance between the camera 1810 and the filming target 1812. The resulting distance measurements are then passed, as a digital or analogue signal, to the translation compensator 1880. Applying methods, such as discussed above with respect to FIGS. 16 and 17, the translational compensator is able to determine a correction update for adjusting the tilt angle of the camera. Based on the determined correction update, the translation compensator 1880 then determines and issues correction commands directed (compensated tilt angle) to compensate for the detected translational movement.

Figure 19:
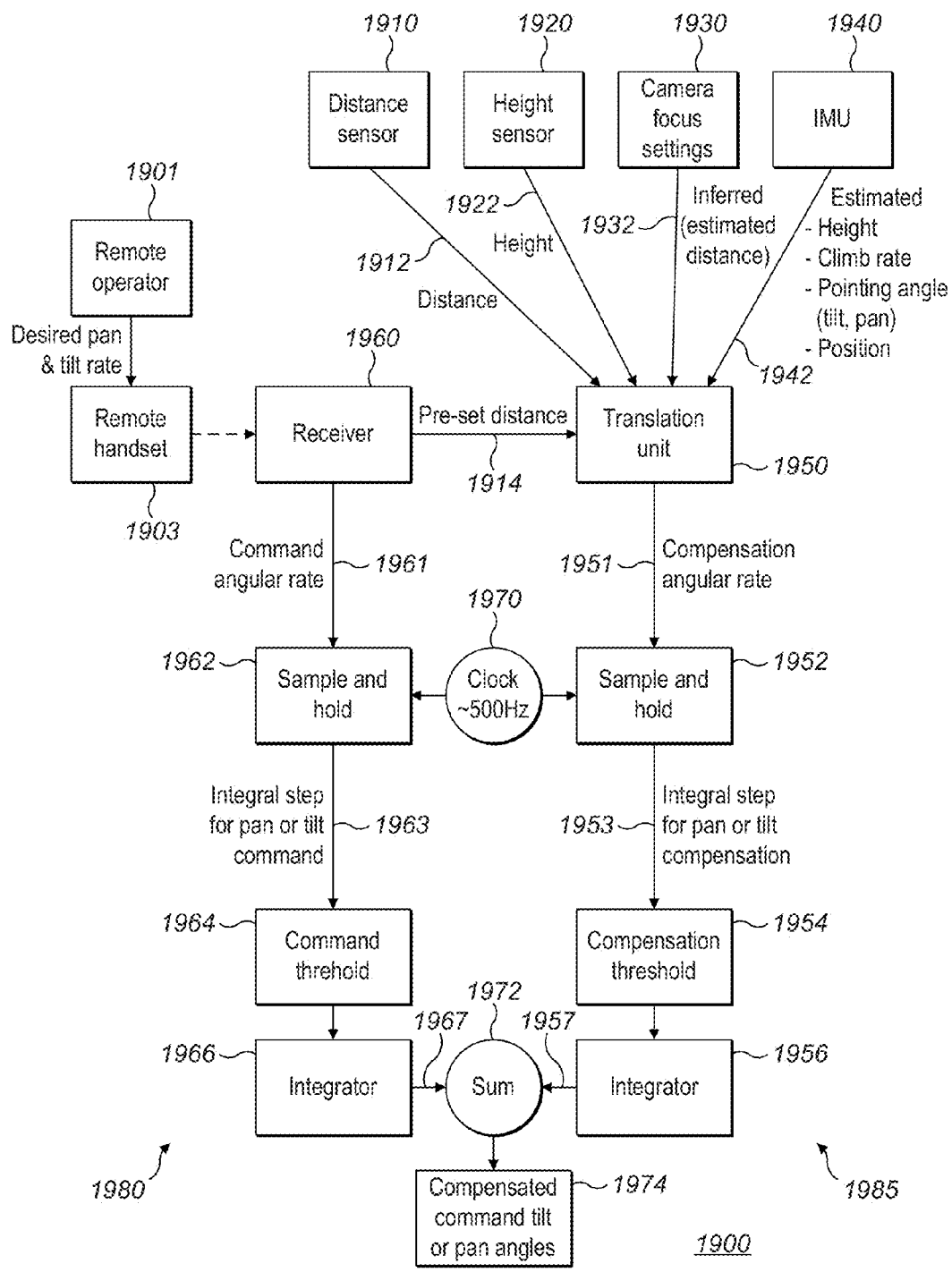
FIG. 19 depicts a system for automatically correcting camera's pointing angle to compensate for translational movements, according to some embodiments.

FIG. 19 shows a system 1900 for determining a compensated command angle 1974 (tilt or pan), in accordance with some embodiments. Generally speaking, the compensated command angle 1974 is a desired pointing angle of the camera, modified to provide for a gradual change in the camera's pointing angle, and further modified to gradually compensate for a translational motion of the camera. The system 1900 runs two interrelated processes—a process 1980 for determining a command angle 1967 and a process 1985 for determining a compensation angle 1957—the results of which are then combined to determine the compensated command (tilt or pan) angle 1974 that is outputted to a P control element of an active stabilization controller, such as a P control element 1840 of FIG. 18.

In some embodiments, the translation compensator executes both processes 1980 and 1985, such as shown in FIG. 19. In some other embodiments, the processes 1980 and 1985 are performed by different components of the active stabilization system. For example, the process 1985 may be executed by the translation compensator, such as shown in FIG. 18.

In the process 1980, a remote operator 1901 indicates a desired pan and/or tilt rate, using a remote handset (joystick, computer, or the like). For example, a joystick for controlling the direction of the camera determines a slew rate based on the joystick's position. The remote handset transmits respective data to a receiver 1960 of the active stabilization system, using a remote link, such as a radio link, wired link, or the like. Using the data received from the receiver 1960 and data received from the IMU 1940 concerning a current pointing camera angle, such as a current angular rate, the receiver 1960 derives a command angular rate that would bring the camera's pointing angle toward a pointing angle desired by the camera operator.

In the process 1985, a translation element (unit) 1950 receives IMU measurements 1942, acquired and provided by an IMU 1940 in association with a translational movement of the camera. As discussed herein, these measurements may include a climb rate (translational velocity), position, pointing angle, and/or height. The translation element 1950 may also receive a distance measurement 1912 (reflecting the distance from the camera to the filming target) sensed and provided by a range sensor 1910, a height measurement 1922 (reflecting how high the camera is in relation to a selected reference point, such as ground) sensed and provided by a range sensor 1910, a distance measurement 1932 (reflecting the distance from the camera to the filming target) inferred from the camera focus settings 1930, and/or a pre-determined distance 1914, set by a camera operator and provided, for example, via the receiver 1960.

In some embodiments, the distance sensor 1910 is the primary source of measurements for the distance from the camera to the filming target. However, in some other embodiments, additional sources are used to derive the distance from the camera to the filming target, such as camera focus settings, GPS locations of the camera and the filming target, and the like. Further, in some embodiments, multiple sources are employed to determine the distance value. By correlating distance measurements from different sources, in certain circumstances, a more precise estimate of the distance value may be derived, particularly when it is not possible to use the range sensor 1910.

Based on the received data, the translation element (unit) 1950 calculates a correction value 1951, such as a compensation angular rate, using, for example, the methodology described with respect to FIGS. 16 and 17.

To ensure smooth adjustment of the camera's pointing angle, the processes 1980 and 1985 rely on integration approaches (such as Simpson's or trapezoidal integration), which provide for gradual adjustments to the camera's pointing angle with each update cycle, leading to illusion of a continuous motion. That is, rather than issuing a single command to adjust the current camera angle in accordance with the determined angular command and/or compensation rate, the camera's pointing angle is adjusted in incremental steps, determined in accordance with a selected integration technique.

Both the command angular rate 1961 and compensation angular rate 1951 are sampled at a fixed update rate, as set by a clock 1970. This update rate effectively defines a control loop period that is used to determine initial incremental steps for adjusting the camera's pointing angle to achieve a desired angle and/or compensate for a translational movement respectively. That is, the control loop period enables determination of an incremental command update (step) 1963 and an incremental compensation update (step) 1953 based on the command angular rate 1961 and the compensation angular rate 1951 respectively. For example, the clock update rate of 500 Hz results in the control loop period of 2 ms. If the command or compensation angular rate is 1°/s, the incremental step will be 1°/s×0.002 s=0.002°. If the pointing angle is adjusted with each cycle with the incremental steps 1963 and/or 1953, the pointing angle gradually becomes the desired (command) angle and/or compensated for the translational movement.

Such an angle correction process may be expressed by the following equation:

$$\theta_{t+dt} = \theta_t + \omega_{t+dt} \quad (4),$$

where $\theta$ is a pointing angle and $\omega$ is an incremental angle update. This approach is also known as simple integration or Simpson's technique.

Although the simple integration approach provides for gradual adjustment and performs well, for example when the camera is moved with a constant speed, in certain circumstances, a more precise approximation of a continuous motion may be preferable. For example, camera's translational movements that do not have a constant speed will require correction commands (such as the compensation angular rate) that vary in time. Under such circumstances, a more precise approximation may be desired. Thus, in some embodiments, a more accurate numerical integration technique, such as a trapezoidal integration, is used to reduce integrated errors in the pointing angle. In accordance with this technique, the current and previous incremental angular rates are averaged, and the resulting value is used for the angle step update. This angle correction method may be expressed by the following equation:

$$\theta_{t+dt} = \theta_t + (\omega_t + \omega_{t+dt})/2 \quad (5),$$

where $\theta$ is a pointing angle and $\omega$ is an incremental (command or compensation) angle update.

Returning to FIG. 19, the sample and hold elements 1962 and 1952 determine the incremental command and compensation updates 1963 and 1953 in the manner described above. If the processes 1980 and 1985 rely on the simple integration approach (4), an integrator 1966 derives the command angle 1967 based on the current pointing angle and the incremental command update 1961, while an integrator 1956 outputs the incremental compensation update 1953 as the compensation angle 1957. If the processes 1980 and 1985 rely on the trapezoidal integration approach (5), the incremental command and compensation updates 1963 and 1953 are first averaged with respective incremental command and compensation updates determined at the previous update cycle. Then, the averaged incremental command update is used by the integrator 1966 together with the current pointing angle to derive the command angle 1967, while the integrator 1956 outputs the averaged incremental command update as the compensation angle 1957. A summation element 1972 adds the outputs 1967 and 1957 to derive the compensated command angle 1974.

The skilled person would appreciate that the processes 1980 and 1985 are not limited to employing the simple or trapezoidal integration approaches, and other integration approaches, such as Newton-Cotes rules, may also be used. The processes 1980 and 1985 for calculating the command and compensation angles 1967 and 1957 respectively are then adjusted accordingly. Further, it is not necessary for the processes 1980 and 1985 to implement the same integration approach, and rather different integration approaches may be used.

In some embodiments, not every detected change in a desired pointing angle and/or not every detected translational motion will result in an adjustment applied to the camera's pointing angle. For example, the IMU may be subject to some drift and noise, which could cause a low random walk of the detected pointing angle, when no pointing direction change is required. A translational velocity may be determined where the camera has not experienced a translational motion. The remote controller (such as a joystick) for setting a desired angle may be subject to a drift, e.g., the control stick is not exactly centralized. To discriminate against slow movements of the camera and/or small displacements of the control stick, detected in error or likewise, a threshold element 1954 and/or a threshold element 1964 are incorporated into the processes 1985 and 1980 respectively.

Generally speaking, the thresholds 1954 and 1964 create a dead zone ([−threshold, +threshold]), in which no adjustments are made to the camera's pointing angle. That is, the angle (tilt or pan) of the camera remains static, until either a real angular rate is commanded, e.g., by the remote operator, or the camera (the gimbal housing the camera) is moved with some substantial velocity. As shown in FIG. 19, these thresholds may be set in relation to the incremental angle updates. That is, when the determined incremental angle update 1953 and 1963 exceeds a respective threshold, the processes 1985 and 1980 proceed as described above. However, if the absolute value of the incremental angle update 1963 equals to or is below the respective threshold (the incremental angle update 1963 is within a respective threshold window), then the desired pointing angle is not changed. Similarly, if the absolute value of the incremental angle update 1953 equals to or is below the respective threshold (the incremental angle update 1963 is within a respective threshold window), then no angle compensation is commanded, or in other words, the output of the integrator 1956 is zero.

It should be understood, that it is not necessary for both processes 1985 and 1950 to use a threshold, and when the both processes implement respective thresholds, such thresholds may differ or be the same. The thresholds may be set dependent on technical characteristics of the remote controller and the IMU and/or be adjustable by, for example, a camera operator. In some embodiments, the command threshold is a value just above the joystick drift, while the compensation threshold is a value above the noise of the sensors.

Although in FIG. 19, the command and compensation thresholds are set in relation to the incremental command and compensation angle updates respectively, other configurations are possible, such as setting thresholds against command and compensation angular rates. For examples, in some embodiments, a threshold is set such that only velocities above a certain level contribute to changes in the pointing angle. The threshold values are adjustable and may vary, for example, depending on a specific application of the gimbal. A threshold of 5 cm/s is, for example, employed in some embodiments for the cinematography applications.

Where the compensation threshold is in use, the operator would have to manually correct the camera's pointing angle if a displacement of the filming target from the camera's field of view is caused by translational movements with associated velocities lower than a pre-set threshold (slow motions). In other words, the remote operator would have to use the controls to adjust the desired angle to compensate for slow movements causing changes to the camera's field of view. Fast movements would be generally automatically compensated, where the camera operator may only have to trim the error.

Figure 20:
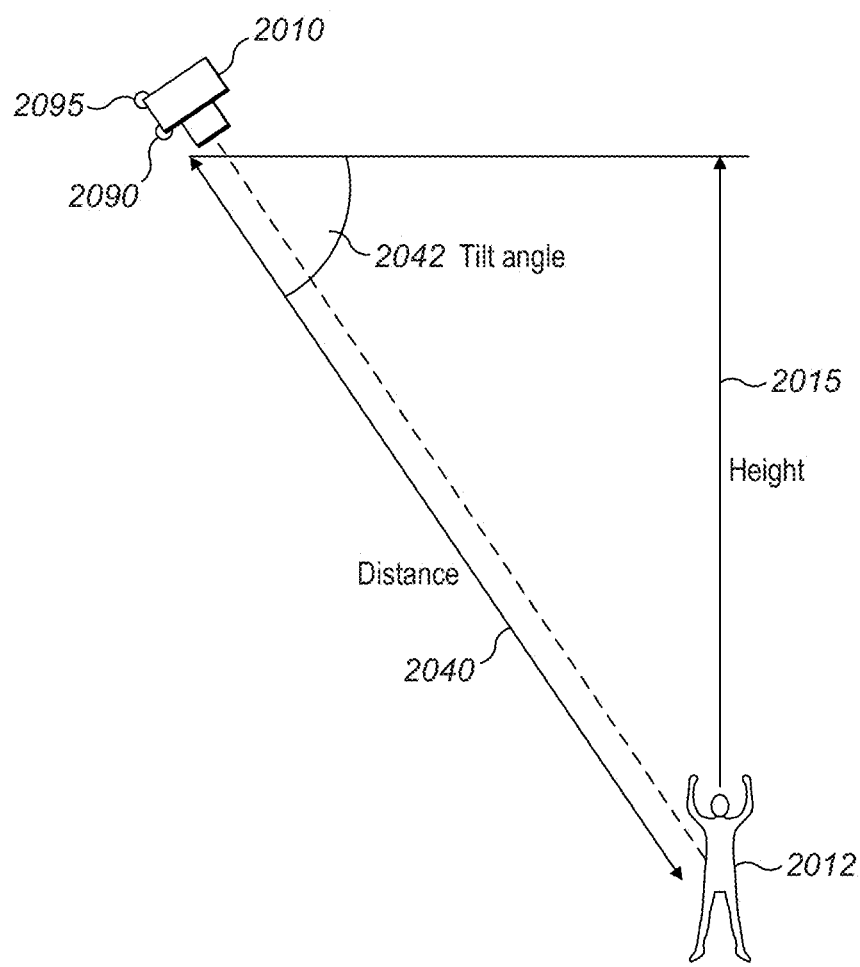
FIG. 20 illustrates a relation of a tilt angle of an elevated camera to camera's height and a distance to a filming target, according to some embodiments.

FIG. 20 shows a scenario where the pointing angle correction update is determined using an approach based on height measurements, according to some embodiments. More specifically, a camera 2010 is elevated in relation to a filming target 2012. The camera 2010 includes a range sensor 2095, which measures how high the camera is in relation to a reference point, such as ground, a filming subject (target), or other predetermined point. In FIG. 20, the filming subject (target) 2012 is located at the ground level and the ground is substantially flat. Thus, the height measurements, obtained by the range sensor 2095, generally reflect a vertical distance (height) 2015 of the camera 2010 in relation to the filming target 2012. Provided that the range sensor 2095 is reset with a reference of zero for the horizontally pointing camera angle in relation to the filming target, a tilt angle suitable for keeping the filming target within the camera's field of view can be derived using the following equation:

$$\theta = a\sin(\text{distance/height}) \quad (6),$$

where $\theta$ is a compensated tilt angle, such as the tilt angle 2042, distance is a direct distance between the camera and the filming target, such as a distance 2040, and height is a vertical distance from the camera to the filming target, such as the height 2015.

For the camera tilt angle $\delta$ to accurately represent an angle suitable for keeping the filming target within the camera's field of view, the height measurements 2015 need to be accurate. In particular, erroneous height measurements due to, for example, an obstacle in the path of the sensor, a sloping ground, the filming target being elevated in relation to the ground, or the like, will likely produce a non-suitable tilt angle, thus corrupting the angle correction process. To address this problem, in some embodiments, an offset correction value for reducing the height measurement errors is set and updated every time the camera operator changes the desired tilt setting. The offset correction value is the difference between the measured/determined height and the calculated height from the tilt angle set by the camera operator and distance:

$$\text{Offset\_correction} = \text{height\_measured} - \text{distance} \times \sin(\text{tilt command}) \quad (7),$$

where Offset_correction is the offset correction value, height_measured is the height, for example, measured by the height range sensor, distance is the distance from the camera to the filming target, and tilt command is the tilt angle as set by the camera operator, for example, using the remote controller.

When the offset correction value is used, the equation (6) may be modified as follows:

$$\theta = a\sin(\text{distance}/(\text{height\_measured} - \text{offset\_correction})) \quad (8).$$

A similar process can be applied to determining a pan angle correction update/value, using GPS measurements to determine the opposite side of the right triangle formed by the camera and the filming target at the horizontal level. Conventional GPS position measurements typically have an accuracy of about 2.5 m CEP over a long time period, which may be insufficient to determine the correction value in close-up shooting due to perceived constant pointing angle wander. Accordingly, in some embodiments, to achieve a greater accuracy and/or to avoid a perceived angle wander, a differential GPS (DGPS) is employed instead of the GPS. The DGPS provides a greater GPS positioning accuracy than GPS, to about 10 cm in some implementations.

In FIG. 20, the camera 2010 includes two range sensors, a sensor 2090 for measuring the distance from the camera 2010 to the filming target 2012, such as discussed above with respect to FIG. 17, and the sensor 2095 for measuring the camera's height is relation to the ground (platform, or other point of reference). This range sensor 2095 may be positioned on the camera itself, on the camera head, or otherwise collocated with the camera, such as on the gimbal structure, as long as the range sensor 2095 is able to obtain camera's height measurements with sufficient (or desired) accuracy. Alternatively, or in addition, in some embodiments, the height measurements are derived from barometric altitude measurements sensed and reported by a barometer sensor of an IMU, such as the barometric altitude measurements 1833 reported by the barometer sensor of the IMU 1830 in FIG. 18.

Returning to FIG. 19, in some embodiments, the translation element 1950 implements the height measurement approach to determine the compensated (tilt or pan) angle. Then the translation element compares the determined compensated angle to the camera's pointing angle as sensed by the IMU to determine the compensation angular rate 1951. Otherwise, the process 1985 is executed in the manner described with respect to FIG. 19.

In some embodiments, however, both the angular rate and height measurement approaches are employed to determine the compensation angle. For example, the translation element 1950 may select one of the two approaches depending on whether the detected translational motion is slow or fast (e.g., the height measurement approach for slow motions and the angular rate approach for fast motions), or alternatively, use the compensation angular rate derived based on the height measurement approach to calibrate the compensation angular rate derived based on the angular rate approach, or vice versa.

Figure 21:
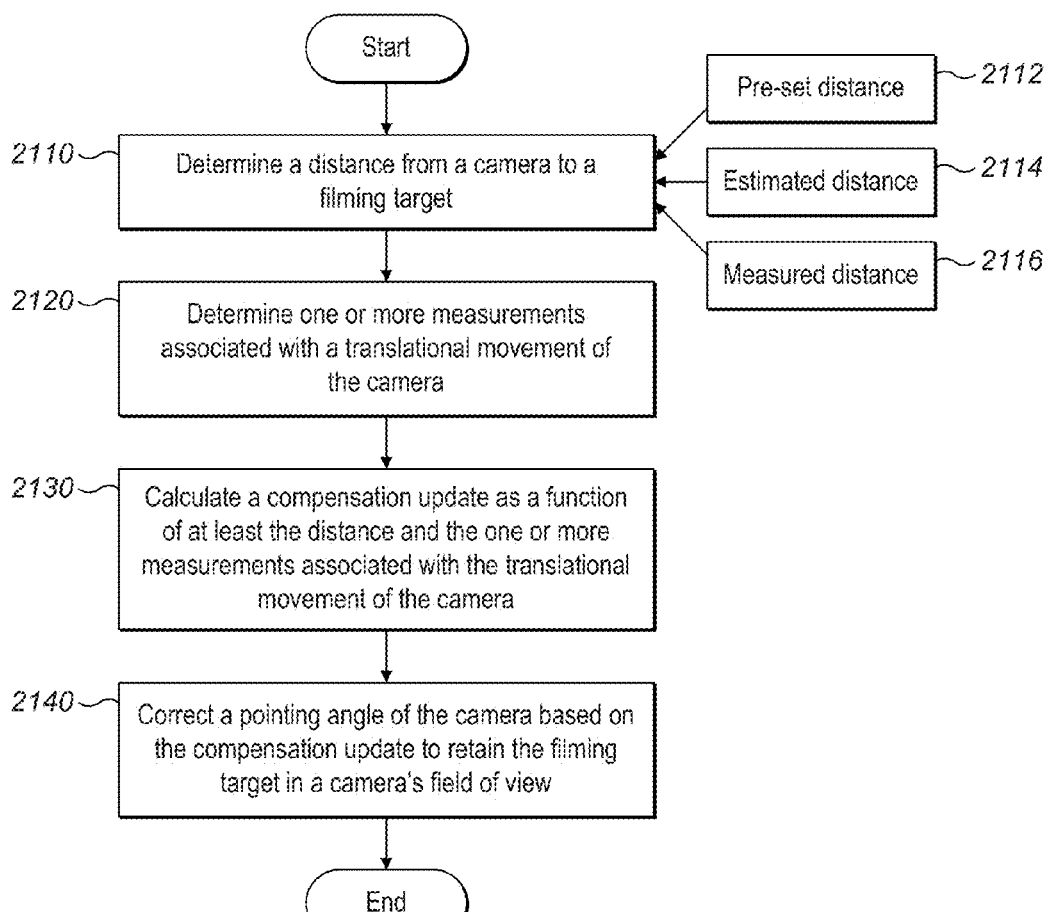
FIG. 21 depicts a method for automatically correcting camera's pointing angle to compensate for translational movements, according to some embodiments.

FIG. 21 illustrates a method 2100 for automatically correcting a pointing angle of an actively stabilized camera in accordance with some embodiments. The method 2100 starts with step 2110, at which a distance from a camera to a filming target is determined. As discussed above, for example, with respect to FIG. 19, the distance may be pre-set by a camera operator (a distance 2112), derived from camera focus settings and/or GPS readings (an estimated distance 2114), and/or measured using, for example, a range sensor collocated with the camera (a measured distance 2116).

At step 2120, one or more measurements (translational measurements) associated with the detected translational movement are determined. Such measurements include, but not necessarily limited to, a velocity of the camera (translational, vertical, horizontal) and/or a height associated with the translational movement. The translational measurements are generally derived by an IMU of the actively stabilized system based on data gathered by IMU's sensor(s), but may also be derived from data gathered by other sensors, such as a height range sensor.

At step 2130, a compensation (correction) update for adjusting the camera's pointing angle is determined as a function of at least the translational measurement(s) and the distance. Such determination, may, for example, be performed, using methods described with respect to FIG. 16, FIG. 17, and/or FIG. 20. Some of these methods may require additional measurements to determine the compensation update in certain scenarios. That is, they employ functions requiring input of multiple parameters, which include the translational measurements and the distance and some additional parameters. For example, the method of FIG. 17 requires an additional parameter, i.e., a current pointing angle of the camera, to determine the compensation update corresponding to a vertical displacement of an elevated camera.

At step 2140, the pointing angle of the camera is corrected based on the determined compensation update so as to retain the filming target within the camera's field of view. As discussed herein, for example, with respect to FIG. 19, it is preferable to correct the pointing angle gradually, using incremental steps, to create an illusion of a smooth motion. As such, in some embodiments, the compensation update is broken into incremental update steps, which are applied incrementally to the pointing angle, using integration technique(s), such as described with respect to, for example, FIG. 19. However, the pointing angle may also be corrected simply by adjusting the angle by the determined compensation update. Whether the compensation update is applied as a whole or incrementally, the camera's pointing angle is adjusted to compensate for the translational movement, enabling the camera to retain the filming target within its field of view.

Figure 22:
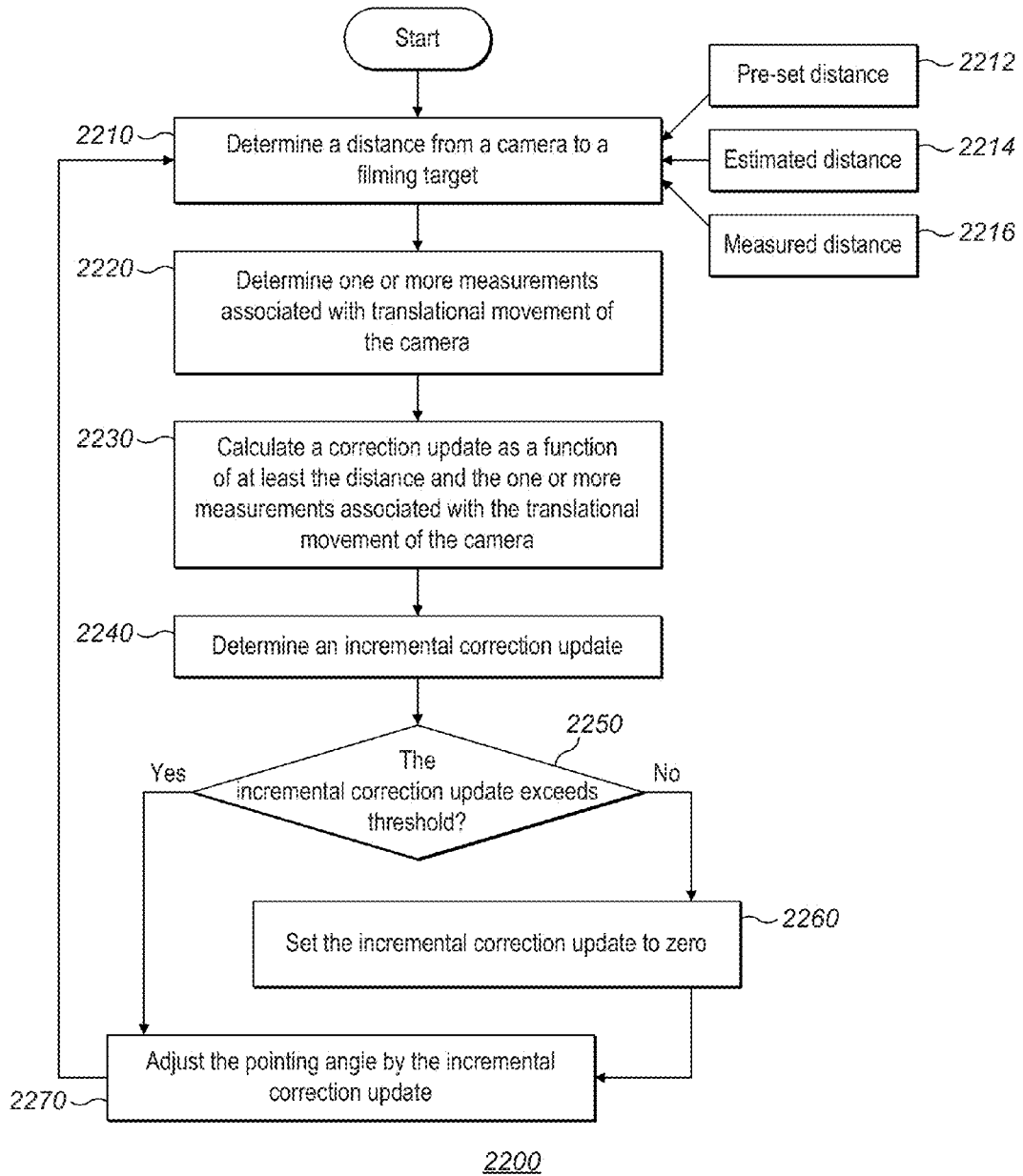
FIG. 22 depicts a method for automatically correcting camera's pointing angle to compensate for translational movements using incremental updates, according to some embodiments.

FIG. 22 illustrates a method 2200 for automatically correcting a pointing angle of an actively stabilized camera using incremental updates, in accordance with some embodiments. Steps 2210, 2220, and 2230 are similar to steps 2110, 2120, and 2130 of FIG. 21 and performed in a similar manner. The result of step 2230 is a correction update, such as angular rate, indicating adjustments needed to be applied to the commanded pointing angle so as to compensate for the translational motion and retain the filming target in the camera's field of view.

As discussed herein, for example, with respect to FIG. 19, it is preferable to correct the camera's pointing angle gradually with incremental steps so as to provide an illusion of a smooth motion. At step 2240, such an incremental update step (incremental correction update) is determined. The incremental update step is generally based on the correction update output and an update rate of a control loop implemented by the active stabilization system (described in greater detail with respect to FIG. 19). By applying the incremental correction update at each update cycle, the pointing angle will be gradually updated to compensate for the detected translational movement. However, it should be understood that, in method 2200, the incremental correction updates might vary from one update cycle to the next one. As the correction update and incremental correction update are calculated anew at each update cycle, using updated data concerning the translational movement, the resulting value may differ, for example, when the translational movement varies with speed over time.

At step 2250, the incremental correction update is compared against the threshold. As discussed in greater detail with respect to FIG. 19, the threshold enables discrimination of translational movements, which are too slow to warrant an update or are detected in error. As the incremental correction update may be positive or negative, in some embodiments the threshold essentially sets a dead zone (a range, a window, or the like) [−threshold, +threshold] defining which incremental update corrections should be ignored. Thus, at step 2250, a determination is made whether the calculated incremental correction update falls outside (exceeds) the threshold range (if the threshold is defined as a range) or whether the absolute value of the calculated incremental correction update is above (exceeds) the set threshold, if the threshold is a set value.

A positive determination at step 2250 causes the method 2200 to proceed with adjusting of the pointing angle (such as the command angle 1967 in FIG. 19) by the incremental correction update at step 2270. A negative determination at step 2250 indicates that no correction update to compensate for the translation movement is required. Thus, at step 2260, the incremental correction update is set to zero. The method then proceeds to step 2270 at which the pointing angle is adjusted. Since the incremental correction update has been set to zero, effectively, the pointing angle remains the same. The output of step 2270 is then provided to the active stabilization system as a commanded angle for stabilization (described in more details with respect to FIGS. 18 and 19), while the method 2200 returns to step 2210 to repeat the loop of determining the correction and incremental correction updates.

It should be understood that either of the methods 2100 and 2200 could be performed to compensate for vertical and/or horizontal translational movements of the camera. Further, the order of execution or performance of the operations in the embodiments illustrated and described herein is not essential, unless otherwise specified. For example, order of steps 2110 (or 2210) and 2120 (or 2220) of the methods 2100 and 2200 may be changed. That is, the operations/steps described herein may be performed in any order, unless otherwise specified, and embodiments may include additional or fewer operations/steps than those disclosed herein. For example, a particular selected order and/or number of steps of methods may depend on camera's operator preferences and/or technical specifications of the gimbal stabilization system and/or camera and/or their components. It is further contemplated that executing or performing a particular operation/step before, contemporaneously with, or after another operation is in accordance with the described embodiments.

The methods and operations described herein may be encoded as executable instructions embodied in a computer readable medium, including, without limitation, non-transitory computer-readable storage, a storage device, and/or a memory device. Such instructions, when executed by a processor (or one or more computers, processors, and/or other devices) cause the processor (the one or more computers, processors, and/or other devices) to perform at least a portion of the methods described herein. A non-transitory computer-readable storage medium includes, but is not limited to, volatile memory, non-volatile memory, magnetic and optical storage devices such as disk drives, magnetic tape, CDs (compact discs), DVDs (digital versatile discs), flash memory cards, such as a micro-SD memory card, or other media that are capable of storing code and/or data.

The methods and processes can also be partially or fully embodied in hardware modules or apparatuses or firmware, so that when the hardware modules or apparatuses are activated, they perform the associated methods and processes. The methods and processes can be embodied using a combination of code, data, and hardware modules or apparatuses.

Examples of processing systems, environments, and/or configurations that may be suitable for use with the embodiments described herein include, but are not limited to, embedded computer devices, personal computers, server computers (specific or cloud (virtual) servers), hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like. Hardware modules or apparatuses described in this disclosure include, but are not limited to, application-specific integrated circuits (ASICs), field-programmable gate arrays (FPGAs), dedicated or shared processors, and/or other hardware modules or apparatuses.

It is to be understood that the present disclosure includes permutations of combinations of the optional features set out in the embodiments described above. In particular, it is to be understood that the features set out in the appended dependent claims are disclosed in combination with any other relevant independent claims that may be provided, and that this disclosure is not limited to only the combination of the features of those dependent claims with the independent claim from which they originally depend.

It should be further understood that multiple parameters and settings discussed herein are adjustable by the camera operator and/or remote operator, at the time the active stabilization system is initialized and/or while in use, e.g., during filming. More specifically, in some embodiments, the remote operator may set up or adjust any of the parameters and settings discussed herein, using a remote controller, a computer (or other processing device) running a set-up/adjustment application, or any other device in communication with the active stabilization system and/or camera, via a remote link, wireless, such as radio (e.g., cellular, Wi-Fi, Bluetooth) or wired (e.g., fiber optics, cabling, or the like). The set-up/adjustment application provides its user (e.g., remote operator, camera operator, or other) with a graphical interface (GUI) that enables the user to select and adjust desired parameters and/or settings for the active stabilization system and/or camera, activate or deactivate different modes supported by the active stabilization system, including for selected or all axes (pan, tilt, roll), and/or camera, and the like. Corresponding commands (data, values) are transmitted to the active stabilization system and/or camera so as to update the respective parameters and settings there. That is, the user is able to control and adjust various parameters and settings of the camera and/or active stabilization system and/or activate/deactivate different modes remotely, using a specially designed application, installed on the device or web-based. The adjustable parameters and settings include, but are not limited to, camera's settings, e.g., focal settings, such as a focal length of the lens; distances, e.g., to the filming subject, height, or the like; various thresholds, scale factors, forcing functions, control loops settings, such as PID gains, maximum and/or minimum values, filters settings and bandwidth, settings for different axes, sensors' settings, storage settings, control rates, calibrations, offsets, and the like. The application may also inform the user about the system/camera's status and voice alarms when errors are detected.

Further, while the invention has been described in terms of various specific embodiments, the skilled person would recognize that the invention can be practiced with modification within the spirit and scope of the claims.

The invention claimed is:

1. A method for correcting a pointing direction of a camera, actively stabilized by an active stabilization system in accordance with a commanded pointing angle, to compensate for translational movements of the camera, the method comprising:
determining a distance from the camera to a filming target;
deriving one or more translational measurements associated with a translational movement of the camera;
calculating a correction update as a function of at least the distance and the one or more translational measurements, wherein the function provides correction updates of lower values for the camera having a higher elevation in relation to the filming target than for the camera having a lower elevation in relation to the filming target for translational movements of a same magnitude; and
adjusting the commanded pointing angle of the camera based on the correction update to retain the filming target within a field of view of the camera.

2. A method according to claim 1, further comprising:
stabilizing the pointing direction of the camera based on the adjusted commanded pointing angle.

3. A method according to claim 1, wherein the determining a distance step comprises at least one of:

obtaining the distance, wherein the distance has been preset by a camera operator;
estimating the distance based on focus settings of the camera;
estimating the distance based on global positioning system (GPS) locations of the camera and the filming target; or
using a first range sensor co-located with the camera to measure the distance.

4. A method according to claim 3, wherein the first range sensor is one of: an ultrasonic sensor, a laser sensor, an optical sensor, and an infrared sensor.

5. A method according to claim 1, wherein the one or more translational measurements comprise one or more of: a translational velocity of the camera and a vertical height derived in association with the translational movement of the camera.

6. A method according to claim 1, wherein
if the method is performed in association with a tilt axis, the one or more translational measurements are derived for the translational movement that is vertical and the commanded pointing angle adjusted at the adjusting step is a tilt angle, and
if the method is performed in association with a pan axis, the one or more translational measurements are derived for the translational movement that is horizontal and the commanded pointing angle is adjusted at the adjusting step is a pan angle.

7. A method according to claim 1, wherein the calculating a correction update step comprises:
calculating a correction update as a function of at least the distance, the one or more measurements, and a current pointing angle of the camera.

8. A method according to claim 1, wherein the correction update is one of an angular rate and an incremental angle update.

9. A method according to claim 1, further comprising:
setting the correction update to zero if the determined correction update is below a pre-set threshold.

10. A method according to claim 1, wherein
the commanded pointing angle is adjusted incrementally, using an incremental correction update determined based on the correction update; and
the distance, the one or more translational measurements, and the correction update are being updated with each incremental step.

11. A method according to claim 10, further comprising:
determining the incremental correction update based on the correction update and an update rate of an update cycle of the active stabilization system,
wherein the adjusting step comprises adjusting the commanded pointing angle of the camera by the incremental correction update.

12. A method according to claim 11, wherein the determining the incremental correction update comprises:
determining, based on the correction update and the update rate of the active stabilization system, a current incremental correction update for a current update cycle; and
using the current incremental correction update and one or more prior incremental correction updates determined for one or more prior update cycles respectively to derive the incremental correction update.

13. A method according to claim 1, wherein:
the one or more translational measurements comprise a vertical height of the camera in relation to the filming target; and
the calculating a correction update step comprises:

calculating, based on the distance and the vertical height, a desired pointing angle for retaining the filming target within the field of view of the camera; and calculating the correction update based on the desired pointing angle and a current pointing angle of the camera.

14. A method according to claim 13, wherein the deriving one or more translational measurements step comprises:

measuring a vertical distance of the camera to a reference point in association with the translational movement;

applying an offset correction value to the measured vertical distance to calculate the vertical height of the camera in relation to the filming target, wherein the offset correction value is updated when an operator setting for the commanded pointing angle is changed.

15. A method according to claim 14, wherein the vertical distance is measured using a second range sensor collocated with the camera.

16. A non-transitory computer-readable medium storing program instructions for causing a processor to perform a method for correcting a pointing direction of a camera, actively stabilized by an active stabilization system in accordance with a commanded pointing angle, to compensate for translational movements of the camera, the method comprising:

determining a distance from the camera to a filming target;

deriving one or more translational measurements associated with a translational movement of the camera;

calculating a correction update as a function of at least the distance and the one or more translational measurements, wherein the function provides correction updates of lower values for the camera having a higher elevation in relation to the filming target than for the camera having a lower elevation in relation to the filming target for translational movements of a same magnitude; and adjusting the commanded pointing angle of the camera based on the correction update to retain the filming target within a field of view of the camera.

17. An active stabilization system for correcting a pointing direction of a camera to compensate for a translational movement of the camera, the system comprising:

an inertial measurement unit configured to derive one or more translational measurements associated with a translation movement of the camera;

a distance detector configured to determine a distance between the camera and a filming target;

an active stabilization controller configured to actively stabilize the pointing angle of the camera in accordance with a commanded pointing angle; and a translation compensator configured to:

calculate a correction update as a function of at least the distance and the one or more translational measurements, wherein the function provides correction updates of lower values for the camera having a higher elevation in relation to the filming target than for the camera having a lower elevation in relation to the filming target for translational movements of a same magnitude, and adjust the commanded pointing angle of the camera based on the correction update to retain the filming target within a field of view of the camera.

18. A system according to claim 17, wherein the translation compensator is configured to calculate the correction update and adjust the commanded pointing angle of the camera for at least one of a pan axis or a tilt axis.

19. A system according to claim 18, further configured, in response to a selection by a camera operator, to activate the translation compensator to calculate the correction update and adjust the commanded pointing angle of the camera for one of (1) a pan axis, (2) a tilt axis, and (3) a pan axis and a tilt axis in parallel.

20. A system according to claim 17, wherein the distance detector is configured to determine the distance by performing at least one of:

obtaining the distance, wherein the distance has been preset by a camera operator;

estimating the distance based on focus settings of the camera;

estimating the distance based on global positioning system (GPS) locations of the camera and the filming target; or using a first range sensor co-located with the camera to measure the distance.

21. A system according to claim 20, wherein the first range sensor is one of: an ultrasonic sensor, a laser sensor, an optical sensor, and an infrared sensor.

22. A system according to claim 17, wherein the one or more translational measurements comprise one or more of: a translational velocity of the camera and a vertical height derived in association with the translational movement of the camera.

23. A system according to claim 18, wherein:

if the translation compensator is configured to calculate the correction update and adjust the commanded pointing angle of the camera for the tilt axis, the one or more translational measurements are derived for the translational movement that is vertical and the commanded pointing angle adjusted by the translational compensator is a tilt angle, and if the translation compensator is configured to calculate the correction update and adjust the commanded pointing angle of the camera for the pan axis, the one or more translational measurements are derived for the translational movement that is horizontal and the commanded pointing angle adjusted by the translational compensator is a pan angle.

24. A system accordingly to claim 17, wherein the translational compensator is configured to calculate the correction update as a function of at least the distance, the one or more measurements, and a current pointing angle of the camera.

25. A system according to claim 17, wherein the correction update is one of an angular rate and an incremental angle update.

26. A system according to claim 17, wherein the correction update is set to zero if the determined correction update is below a pre-set threshold.

27. A system according to claim 17, wherein the commanded pointing angle is adjusted incrementally, using an incremental correction update determined based on the correction update; and the distance, the one or more translational measurements, and the correction update are being updated with each incremental step.

28. A system according to claim 27, wherein:

the incremental correction update is determined based on the correction update and an update rate of an update cycle of the active stabilization system, a translation compensator configured to adjust the commanded pointing angle of the camera by the incremental correction update.

29. A system according to claim 28, wherein the incremental correction update is determined by:

determining, based on the correction update and the update rate of the active stabilization system, a current incremental correction update for a current update cycle; and using the current incremental correction update and one or more prior incremental correction updates determined for one or more prior update cycles respectively to derive the incremental correction update.

30. A system according to claim 17, wherein:
the one or more translational measurements comprise a vertical height of the camera in relation to the filming target; and
the correction update is calculated by:
calculating, based on the distance and the vertical height, a desired pointing angle for retaining the filming target within the field of view of the camera; and
calculating the correction update based on the desired pointing angle and a current pointing angle of the camera.

31. A system according to claim 30, wherein the one or more translational measurements are derived by:
measuring a vertical distance of the camera to a reference point in association with the translational movement; and
applying an offset correction value to the measured vertical distance to calculate the vertical height of the camera in relation to the filming target, wherein the offset correction value is updated when an operator setting for the commanded pointing angle is changed.

32. A system according to claim 31, wherein the vertical distance is measured using a second range sensor collocated with the camera.

33. A non-transitory computer-readable medium according to claim 16, wherein the method further comprises:
stabilizing the pointing direction of the camera based on the adjusted commanded pointing angle.

34. A non-transitory computer-readable medium according to claim 16, wherein the determining a distance step comprises at least one of:
obtaining the distance, wherein the distance has been pre-set by a camera operator;
estimating the distance based on focus settings of the camera;
estimating the distance based on global positioning system (GPS) locations of the camera and the filming target; or
using a first range sensor co-located with the camera to measure the distance.

35. A non-transitory computer-readable medium according to claim 34, wherein the first range sensor is one of: an ultrasonic sensor, a laser sensor, an optical sensor, and an infrared sensor.

36. A non-transitory computer-readable medium according to claim 16, wherein the one or more translational measurements comprise one or more of: a translational velocity of the camera and a vertical height derived in association with the translational movement of the camera.

37. A non-transitory computer-readable medium according to claim 16, wherein:
if the method is performed in association with a tilt axis, the one or more translational measurements are derived for the translational movement that is vertical and the commanded pointing angle adjusted at the adjusting step is a tilt angle, and
if the method is performed in association with a pan axis, the one or more translational measurements are derived for the translational movement that is horizontal and the commanded pointing angle adjusted at the adjusting step is a pan angle.

38. A non-transitory computer-readable medium according to claim 16, wherein the calculating a correction update step comprises:
calculating a correction update as a function of at least the distance, the one or more measurements, and a current pointing angle of the camera.

39. A non-transitory computer-readable medium according to claim 16, wherein the correction update is one of an angular rate and an incremental angle update.

40. A non-transitory computer-readable medium according to claim 16, wherein the method further comprises:
setting the correction update to zero if the determined correction update is below a pre-set threshold.

41. A non-transitory computer-readable medium according to claim 16, wherein
the commanded pointing angle is adjusted incrementally, using an incremental correction update determined based on the correction update; and
the distance, the one or more translational measurements, and the correction update are being updated with each incremental step.

42. A non-transitory computer-readable medium according to claim 41, wherein the method further comprises:
determining the incremental correction update based on the correction update and an update rate of an update cycle of the active stabilization system,
wherein the adjusting step comprises adjusting the commanded pointing angle of the camera by the incremental correction update.

43. A non-transitory computer-readable medium according to claim 42, wherein the determining the incremental correction update comprises:
determining, based on the correction update and the update rate of the active stabilization system, a current incremental correction update for a current update cycle; and
using the current incremental correction update and one or more prior incremental correction updates determined for one or more prior update cycles respectively to derive the incremental correction update.

44. A non-transitory computer-readable medium according to claim 16, wherein:
the one or more translational measurements comprise a vertical height of the camera in relation to the filming target; and
the calculating a correction update step comprises:
calculating, based on the distance and the vertical height, a desired pointing angle for retaining the filming target within the field of view of the camera; and
calculating the correction update based on the desired pointing angle and a current pointing angle of the camera.

45. A non-transitory computer-readable medium according to claim 44, wherein the deriving one or more translational measurements step comprises:
measuring a vertical distance of the camera to a reference point in association with the translational movement;
applying an offset correction value to the measured vertical distance to calculate the vertical height of the camera in relation to the filming target, wherein the offset correction value is updated when an operator setting for the commanded pointing angle is changed.

46. A non-transitory computer-readable medium according to claim 45, wherein the vertical distance is measured using a second range sensor collocated with the camera.

47. A method for correcting a pointing direction of a camera, actively stabilized by an active stabilization system in accordance with a commanded pointing angle, to compensate for translational movements of the camera, the method comprising:
determining a distance from the camera to a filming target;

deriving one or more translational measurements associated with a translational movement of the camera, the one or more translational measurements comprising a vertical height of the camera in relation to the filming target;
calculating a correction update as a function of at least the distance and the one or more translational measurements, wherein the calculating a correction update step comprises:
  calculating, based on the distance and the vertical height, a desired pointing angle for retaining the filming target within the field of view of the camera; and
  calculating the correction update based on the desired pointing angle and a current pointing angle of the camera; and
adjusting the commanded pointing angle of the camera based on the correction update to retain the filming target within a field of view of the camera.

* * * * *